(12) United States Patent
Kemp

(10) Patent No.: US 7,488,886 B2
(45) Date of Patent: Feb. 10, 2009

(54) MUSIC INFORMATION RETRIEVAL USING A 3D SEARCH ALGORITHM

(75) Inventor: Thomas Kemp, Esslingen (DE)

(73) Assignee: Sony Deutschland GmbH, Berlin (DE)

( * ) Notice: Subject to any disclaimer, the term of this patent is extended or adjusted under 35 U.S.C. 154(b) by 69 days.

(21) Appl. No.: 11/558,301

(22) Filed: Nov. 9, 2006

(65) Prior Publication Data

US 2007/0131094 A1 Jun. 14, 2007

(30) Foreign Application Priority Data

Nov. 9, 2005 (EP) ................................. 05024429

(51) Int. Cl.
*A63H 5/00* (2006.01)
*G04B 13/00* (2006.01)
*G10H 7/00* (2006.01)
(52) U.S. Cl. .......................................... 84/609; 84/616
(58) Field of Classification Search .................. 84/609, 84/616
See application file for complete search history.

(56) References Cited

U.S. PATENT DOCUMENTS

| | | | | |
|---|---|---|---|---|
| 5,739,451 | A | * | 4/1998 | Winksy et al. ................. 84/609 |
| 5,777,252 | A | * | 7/1998 | Tada ............................ 84/609 |
| 5,874,686 | A | * | 2/1999 | Ghias et al. ................... 84/609 |
| 5,963,957 | A | * | 10/1999 | Hoffberg ................... 707/104.1 |
| 6,476,306 | B2 | * | 11/2002 | Huopaniemi et al. .......... 84/609 |
| 6,528,715 | B1 | * | 3/2003 | Gargi ........................... 84/615 |
| 7,003,515 | B1 | * | 2/2006 | Glaser et al. .................... 707/5 |
| 2002/0088336 | A1 | | 7/2002 | Volker |
| 2006/0065102 | A1 | * | 3/2006 | Xu ............................... 84/600 |
| 2007/0119288 | A1 | * | 5/2007 | Makino ........................ 84/602 |
| 2007/0131094 | A1 | * | 6/2007 | Kemp ........................... 84/609 |
| 2007/0162497 | A1 | * | 7/2007 | Pauws ...................... 707/104.1 |

OTHER PUBLICATIONS

Yongwei Zhu et al: "Melody alignment and similarity metric for content-based music retrieval" Proceedings of the Spie-The International Society for Optical Engineering Spie-Int. Soc. Opt. ENG USA, vol. 5021, 2003, pp. 112-121, XP002372947, ISSN: 0277-786X.

Parker C: "Towards Intelligent String Matching in Query-by-Humming Systems" Multimedia and Expo, 2003, Proceedings. 2003 International Conference on Jul. 6-9 2003, Piscataway, NJ, USA, IEEE, vol. 2, Jul. 6, 2003, pp. 25-28, XP010650735, ISBN: 0-7803-7965-9.

Ghias A et al: "Query By Humming Musical Information Retrieval in an Audio Database" Proceedings of ACM Multimedia '95 San Francisco, Nov. 5-9, 1995, New York, ACM, US, Nov. 5, 1995, pp. 231-236, XP000599035, ISBN: 0-201-87774-0.

* cited by examiner

*Primary Examiner*—Jeffrey Donels
(74) *Attorney, Agent, or Firm*—Oblon, Spivak, McClelland, Maier & Neustadt, P.C.

(57) ABSTRACT

A music information retrieval system and method that involve a query-by-humming (QbH) database system for processing queries in the form of analog audio sequences which encompass recorded parts of sung, hummed or whistled tunes, recorded parts of a melody played on a musical instrument or a speaker's recorded voice articulating at least one part of a song's lyrics to retrieve textual background information about a musical piece whose score is stored in an integrated database of said system after having analyzed and recognized said melody.

10 Claims, 17 Drawing Sheets

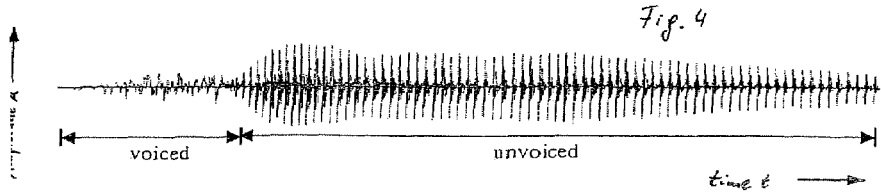
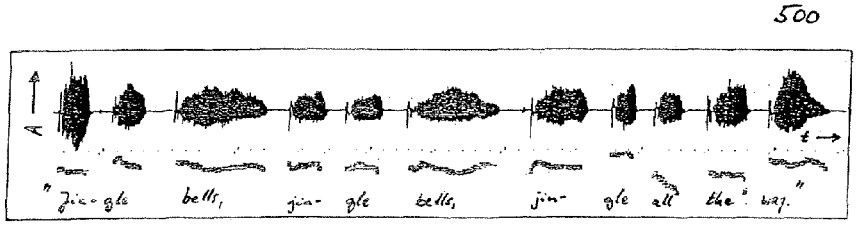

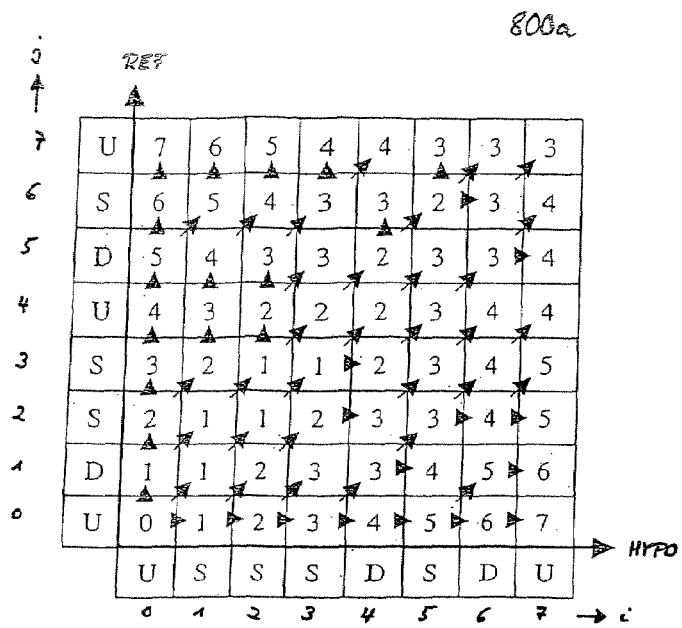
Fig. 8a
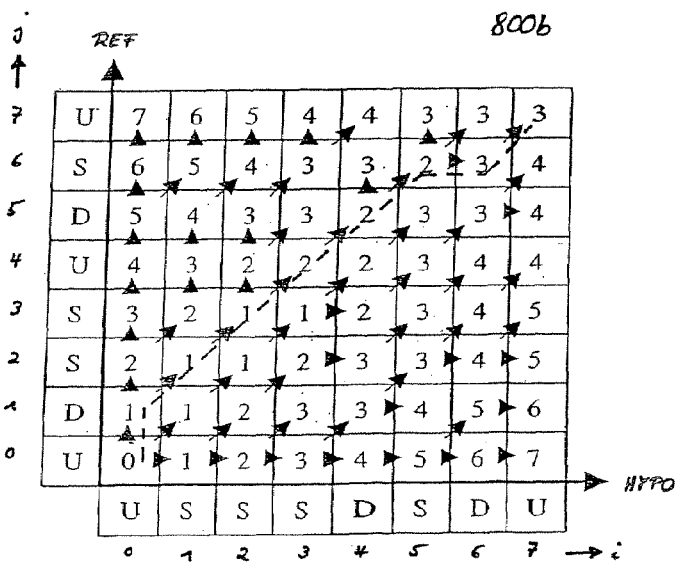
Fig. 8b
800c
| REF | U | D | S | S | U | D | S | * | U |
|---|---|---|---|---|---|---|---|---|---|
| HYPO | U | * | S | S | S | D | S | D | U |
| DTAGS | C | I | C | C | S | C | C | D | C |
| COST | 0 | 1 | 0 | 0 | 1 | 0 | 0 | 1 | 0 |
The total cost here is 3.
(C: correct; D: deletion; I: insertion; S: substitution)
Fig. 8c

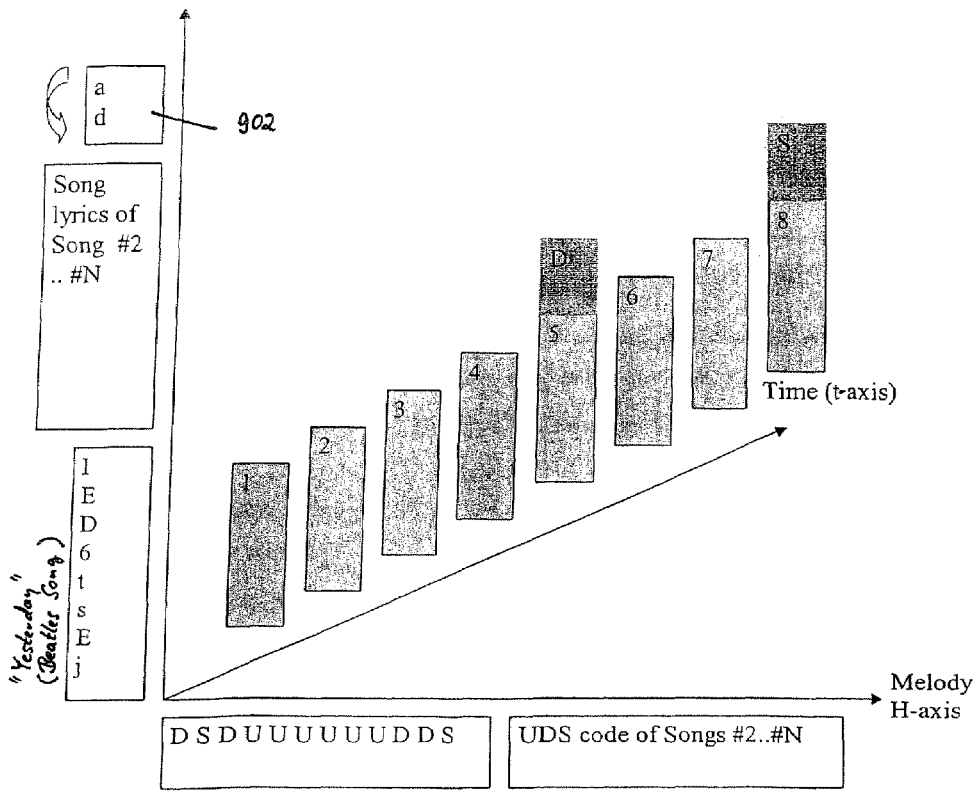
The data at time instance 2, preprocessed for use in speech recognition (the S axis)
The data at time instance 5, preprocessed for use in speech recognition (*light grey* part). At this time, a new note has been detected, resulting in a data item for the *ABC* recognizer (the H axis), here depicted *dark grey*.
Fig. 9

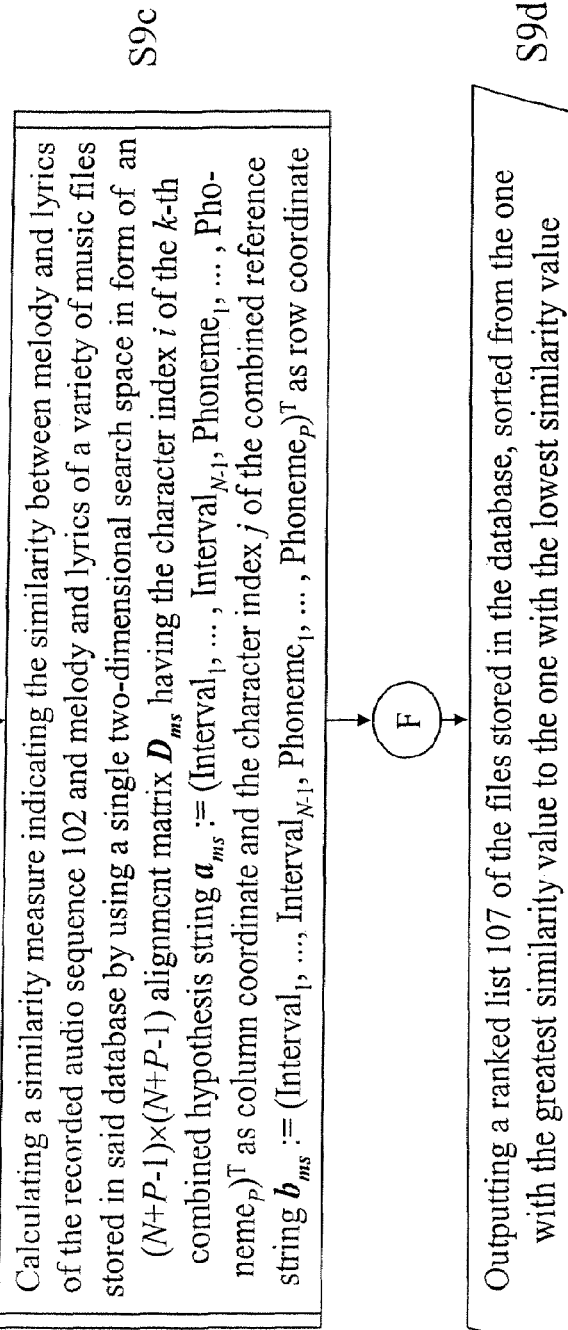

S9c: Calculating a similarity measure indicating the similarity between melody and lyrics of the recorded audio sequence 102 and melody and lyrics of a variety of music files stored in said database by using a single two-dimensional search space in form of an $(N+P-1) \times (N+P-1)$ alignment matrix $D_{ms}$ having the character index $i$ of the $k$-th combined hypothesis string $a_{ms} := (\text{Interval}_1, \ldots, \text{Interval}_{N-1}, \text{Phoneme}_1, \ldots, \text{Phoneme}_P)^T$ as column coordinate and the character index $j$ of the combined reference string $b_{ms} := (\text{Interval}_1, \ldots, \text{Interval}_{N-1}, \text{Phoneme}_1, \ldots, \text{Phoneme}_P)^T$ as row coordinate S9d: Outputting a ranked list 107 of the files stored in the database, sorted from the one with the greatest similarity value to the one with the lowest similarity value End FIG. 11b (continued)

1100b (continued)

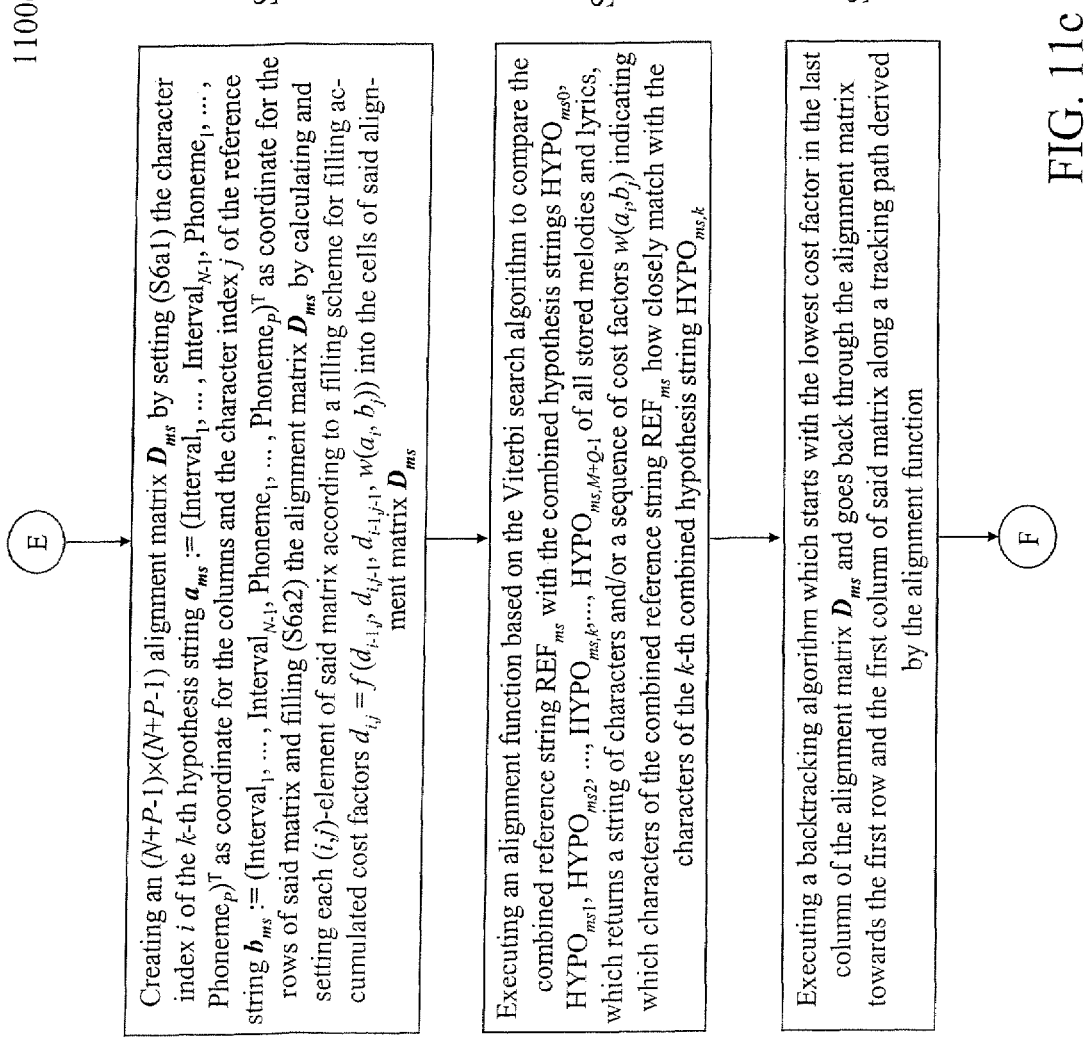

MUSIC INFORMATION RETRIEVAL USING A 3D SEARCH ALGORITHM

FIELD AND BACKGROUND OF THE INVENTION

The present invention relates to the field of music information retrieval systems, in particular to a system that can be applied to retrieve information about a played, sung or hummed melody stored e.g. in a database.

Traditional ways of querying music databases where a user has to type in the title of a song, the name of an interpreter or any other information referring to a specific song, are limited by the growing number of songs stored in said music databases, which makes it difficult for the user to find the song he/she wishes to hear.

An example for a content-based retrieval method is query-by-humming (QbH). QbH systems particularly aim at searching a desired piece of music by accepting queries in the form of sung, hummed or whistled tunes, e.g. in order to find a song from a music library but has forgotten its title or composer.

One of the first QbH system was developed and described in 1995 by the authors A. Ghias, J. Logan, D. Chamberlin, and B. C. Smith in their article "Query by Humming, Musical Information Retrieval in an Audio Database" (Proc. of ACM Multimedia Conf., pp. 231-236, 1995). The QbH system makes it possible to find a song even though the user only knows its melody. It thereby provides a very fast and effective query method when looking for a particular song in a large music database.

As depicted in FIGS. 1a-c, 2a and 2b, a QbH system basically takes a hummed melody as input data and compares it with the songs stored in an integrated database. The output data of the QbH system is usually a ranked list of songs classified in the order of similarity. The first song listed should therefore be the searched song. Since the comparison has to be done between two media of the same type, the hummed melody as well as the files of the database have to be transformed into a format that allows the comparison to be made. For this reason, the hummed melody is first transcribed into musical notation from which the relevant information is then extracted. The extraction of note information from a stave is also known as a "description". As depicted in FIG. 2b, the files stored in said database, which contain the scores of stored songs, go through the same description procedure. Thereby, musical key characteristics (descriptors) are extracted from said files, and a new database of files is created which are in the same format as the transformed hummed melody.

Recent works on QbH are mainly focused on melody representations, similarity measures and matching processing. In some works, only pitch contours (which means the intervals and interval directions of a melody) are used to represent a song. A three-state QbH system, a so-called "UDS system", is based on the assumption that a typical person does not hum correctly. This is actually the case for two reasons: First, people make mistakes in remembering the song they wish to hum and second, people make mistakes in actually humming correctly the song. Based on this assumption, scientists have created a UDS system which supports these kinds of errors.

A UDS system consists of a description of the musical notation obtained by the transcription of a hummed tune into a string of U, D and S letters, and comparing this string to the UDS strings derived from the songs stored in a database. The description is based on the intervals between the recognized notes of the hummed tune. As illustrated in FIGS. 3a-c, an ascending interval is coded by the letter U ("up"), a descending interval is coded by the letter D ("down"), and a "null interval" (a perfect prime) is coded by the letter S ("same"). Finally, the same description is applied to the melodies of various songs stored in the database, and a comparison is made between the UDS string derived from the hummed tune and the UDS string of each stored melody.

As this method deals with interval directions and not with the particular notes of a hummed song's melody, the system works independently from the key of the hummed melody and tolerates wrong notes as long as the interval directions of the hummed tune are correct. The QbH system thus gives a lot of freedom to the hummer, who just needs to be able to make the difference between ascending intervals (U), descending intervals (D) and so-called "null intervals" (S), which means perfect primes.

BRIEF DESCRIPTION OF THE STATE OF THE ART

The problem of music information retrieval and title selection from large databases has been approached from two sides. On the one hand, speech recognition can be used to directly recognize a song's title spoken by a user. This, however, involves relatively high recognition error rates. On the other hand, query-by-humming has been investigated, where people hum (sing, whistle) a part of the melody and the melody itself is then used to perform a search query in the database. A combination of automatic speech recognition and query-by-humming systems can easily be done on the output level of the applied classifiers by using a traditional weighting scheme with a number of weighting factors that have to be determined. Such a solution, however, requires two full-blown recognition systems and merges information at the final stage, which does not allow for efficient pruning and is therefore computationally expensive. In addition, it is difficult for such a system to work properly if the input is not of the type anticipated by both of the systems, e.g. if the input is just spoken and not hummed, or just hummed and not spoken.

In order to create for each music file a corresponding UDS string for the interval directions of the stored song's melody, a script that extracts this information from said melody has to be implemented. This transcription consists of transforming a signal into a sequence of notes by segmenting an audio signal representing said melody into its particular notes and looking at the voiced and unvoiced parts of said signal. When singing, the heard notes are located in the voiced part of the signal, which is actually created by vowels, mutated vowels, or diphthongs (see FIG. 4). The voiced part of the signal is a periodic signal whose fundamental frequency is the frequency of a sung note. The unvoiced part of the signal looks very much like noise in the way that it is randomly created. It is located mostly in consonants. As can be seen in FIG. 4, it is quite easy to distinguish these two kinds of signals.

To create a UDS system, the "get_f0" function from the Entropic Signal Processing System (ESPS)—a comprehensive set of speech analysis and processing tools used for the UNIX environment, which includes UNIX commands and a comprehensive C library—is used. This function takes a ".wav" signal as input and outputs the frequency of the sampled signal when it is voiced and zero when it is unvoiced. Thus, a vector is obtained from which the frequency of the notes, their length and the length of pauses between particular notes of a melody can be extracted (cf. FIG. 5).

As shown in FIG. 6, the base frequency of a note varies significantly with time. To extract the base frequency of the note, different methods are conceivable: taking the maximum, the minimum, the mean, or the median of the measured base frequency. But which is the correct method? Which is the actual base frequency a hummer wants to reach? Of course, this is impossible to know. All methods will have to be tested, but since the purpose is to create a system that works and the results change very slightly from one method to the other, only two systems were implemented so far, one using the mean, the other using the median.

The transcribed hummed melody has to be described into a "melodic contour". This is done by going through the output file of the ESPS and coding each interval with the UDS coding as already proposed for MIDI files.

To compare the description of the hummed tune with the descriptions of the MIDI files, the "alignment" function of "janus"—a tool used in the scope of automatic speech recognition for ASR systems developed by Sony—can be applied. This function, which is based on the Viterbi algorithm, compares two strings of characters and returns which of these characters were substituted, deleted or inserted and which of these characters are correct. In the following, this algorithm is explained by means of an example—a comparison of a hypothesis string with a reference string.

First, an 8×8 alignment matrix D is created. As depicted in FIG. 8a, the hypothesis ("U S S S D S D U") is set as row coordinate and the reference ("U D S S U D S U") is set as column coordinate. A cost factor $w(a_i, b_j)$ is set for a deletion, an insertion and a substitution. Here, the cost factor is 1 for all three types of mistakes ("sub", "del", and "ins"). A cost factor of 0 is set for a correct situation. As shown in FIG. 7a, a substitution or a correct situation consists in moving diagonally through the alignment matrix, thereby adding the appropriate cost factor $w(a_i, b_j)$. A deletion consists in moving horizontally through the matrix, thereby adding each time a cost factor of 1 (cf. FIG. 7b). By contrast, an insertion consists in moving vertically through the matrix, thereby adding each time a cost factor of 1 (cf. FIG. 7c).

Second, the first cell of the matrix is filled in. To do so, the first character of the hypothesis (HYPO) is compared to the first character of the reference (REF). If they are the same, it is a substitution, and a cost of 1 is set to the respective matrix cell. If they are different, it is a correct situation, and a cost of 0 is set to the cell.

Further the entire matrix from the bottom to the top and from the left to the right will be passed through. The three types of mistakes are taken into consideration, and the one with the lowest cost is appointed to the cell.

To fill out the missing cell in the example shown in FIG. 7d, all possibilities ("sub", "del" and "ins") have to be considered and the cost factor for each of them has to be computed (cf. FIGS. 7e-g). The lowest cost factor is the one for a substitution error. It is therefore the one that is applied. In case the cell is situated in the first row, only the insertion error can be computed. In case the cell is situated in the first column, only the deletion error can be computed. If the lowest cost factor is found more than once, the mistake applied follows this rule of preferences: Substitution is preferred to deletion, and deletion is preferred to insertion.

Finally, to find the path taken (cf. FIG. 8b), a backtracking algorithm is executed which starts with the lowest cost factor of the last column and goes back through the alignment matrix. The output values of the alignment function for this case are shown in the table depicted in FIG. 8c. It can be seen that the total cost for this path is 3.

The calculation (S5c) of the similarity measure can e.g. be characterized by the following steps:

creating (S6a) an (N−1)×(N−1) alignment matrix D by setting (S6a1) the character index i of the k-th hypothesis string a, e.g. $(U,S,S,S,D,S,D,U)^T$, as coordinate for the columns and the character index j of the reference string b, e.g. $(U,D,S,S,U,D,S,U)^T$, as coordinate for the rows of said matrix and filling (S6a2) the alignment matrix D by calculating and setting each (i,j)-element of said matrix according to a filling scheme for filling accumulated cost factors $d_{i,j}=f(d_{i-1,j}, d_{i,j-1}, d_{i-1,j-1}, w(a_i, b_j))$ into the cells of said matrix, executing (S6b) an alignment function based on the Viterbi search algorithm to compare the reference string (REF) with the hypothesis strings ($HYPO_0, HYPO_1, \ldots, HYPO_k, \ldots, HYPO_{M-1}$) of all stored melodies, which returns a string of characters and/or a sequence of cost factors $w(a_i, b_j)$ indicating which characters of the reference string (REF) how closely match with the characters of the k-th hypothesis string $HYPO_k$, and executing (S6c) a backtracking algorithm which starts with the lowest cost factor in the last column of the alignment matrix and goes back through the alignment matrix towards the first row and the first column of said matrix along a tracking path derived by the alignment function.

PROBLEMS TO BE SOLVED BY THE INVENTION

QbH systems typically require that a user knows the melody of a song well enough to sing, hum or whistle it, which requires some basic melody being present in the song (which is a problem e.g. in case of genre rap). Furthermore, hummed queries are generally not appropriate for users which have difficulties in humming in key. On the other hand, if the user has too much intonation freedom when singing, humming or whistling a song, this makes the comparison less effective. As can be taken from FIGS. 3b+c, two completely different melodies may have the exact same UDS description. So, none of the existing technology is able or provide a fast and accurate access to songs stored in a song database.

OBJECT OF THE PRESENT INVENTION

In view of the state of the art mentioned above, it is the object of the present invention to provide an efficient query method which can be applied to retrieve information about a piece of music stored in a database.

The aforementioned object is achieved by means of the features contained in the independent claims. Advantageous features are defined in the subordinate claims, which develop further the central idea of the present invention.

SUMMARY OF THE INVENTION

The present invention is dedicated to a content-based music information retrieval system, in particular to a query-by-humming (QbH) database system for processing queries in the form of analog audio sequences encompassing parts of sung, hummed or whistled tunes, parts of a melody played on a musical instrument (e.g. on an electronic keyboard) and/or a speaker's voice articulating at least one part of a song's lyrics to retrieve textual background information about a musical piece after having analyzed and recognized said melody. Said background information e.g. includes the title of said tune, its opus number, the composer, the date of publication, possibly existing dedications, the interpreter as well as further information about the composer's oeuvre and his/her life.

BRIEF DESCRIPTION OF THE DRAWINGS

Advantageous features, aspects, and useful embodiments of the invention will become evident from the following description, the appended claims, and the accompanying drawings. Thereby, FIG. 3a is a stave showing the musical notation of parts of the hummed melody, the time values of the notes, their pitch (semitone) numbers, the key, the intervals between the particular notes of the melody, the interval directions (U="up", D="down", S="same"), and the number of equal-tempered semitones associated with the respective intervals, FIG. 3b is a stave showing the musical notation, the intervals and interval directions of an ascending tonal second sequence, wherein the sequence motive is given by ascending thirds of a diatonic scale (here: the C major scale), FIG. 3c is a stave showing the musical notation, the intervals and interval directions of a descending tonal second sequence, said sequence being the retrograde mode (the horizontal inversion) of the ascending second sequence, FIG. 4 is a diagram showing the amplitude A versus time t of a speech signal for illustrating the change of voiced and unvoiced pronunciation according to the phonemes generated by a speaker's voice while articulating the words of a song's lyrics, FIG. 5 is a diagram showing the output of the ESPS pitch tracker function get_f0, which is used to display the base frequencies of the melody of the hummed Christmas song "Jingle Bells"

DETAILED DESCRIPTION OF THE UNDERLYING INVENTION

In the following, embodiments of the present invention as depicted in FIGS. 2b and 9 to 11c shall be explained in detail. The meaning of the symbols designated with reference signs in FIGS. 1a to 11c can be taken from an annexed table.

Figure 1A:
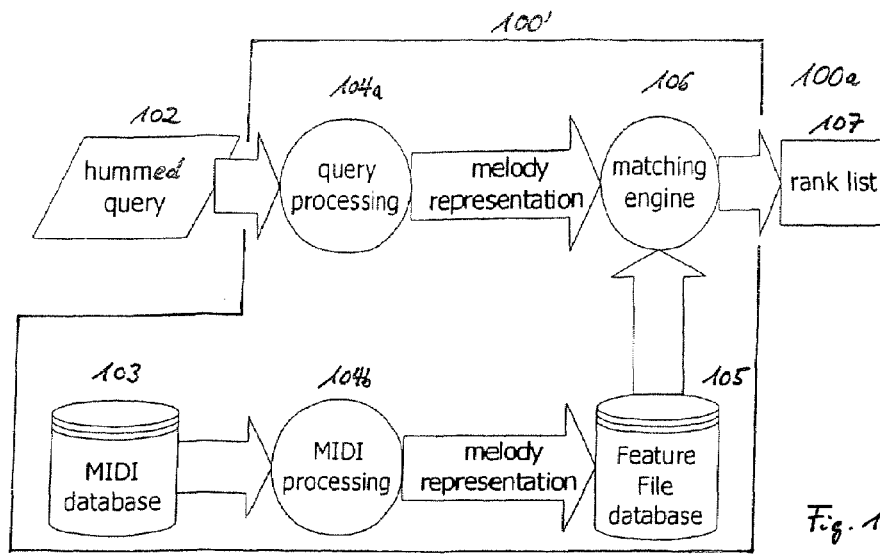
FIGS. 1a-c are block diagrams showing the interactions between the system components of a conventional query-by-humming (QbH) music retrieval system according to the state of the art, FIGS. 2a+b are two schematic views of the QbH music retrieval system.
Figure 1B:
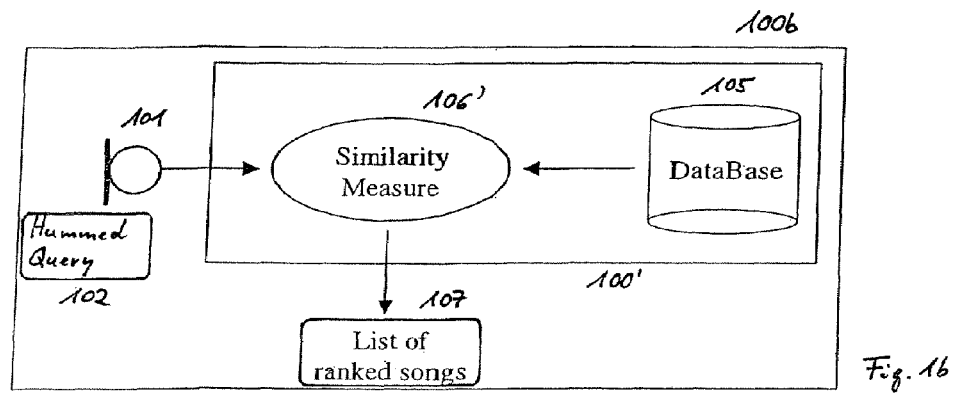
Figure 1C:
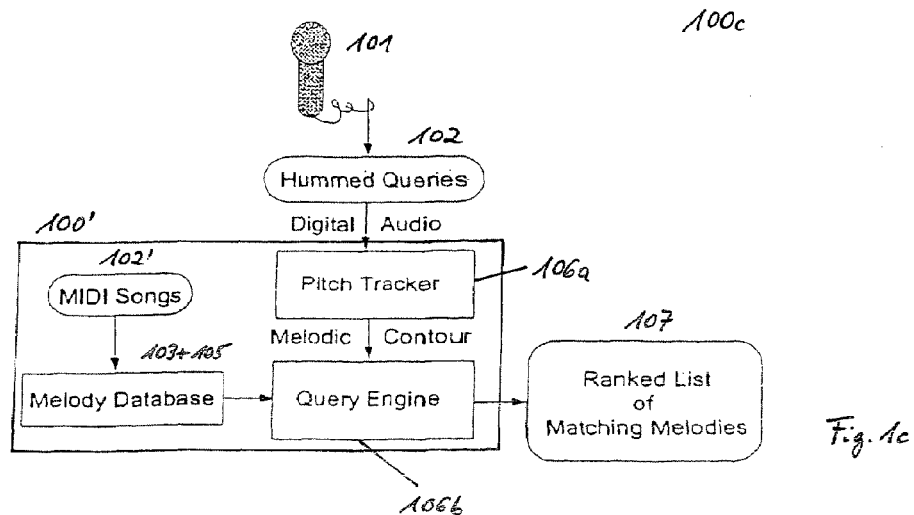
Figure 2A:
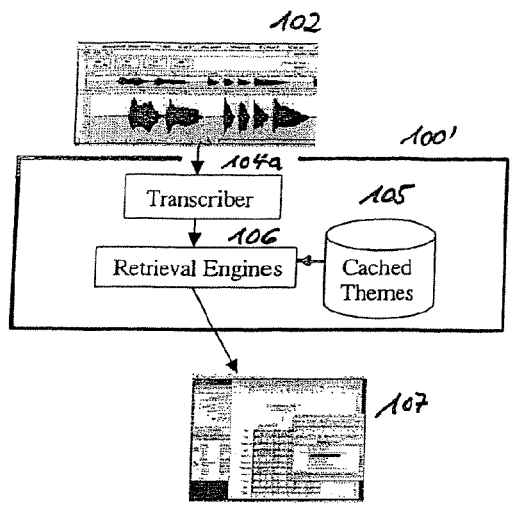
Figure 2B:
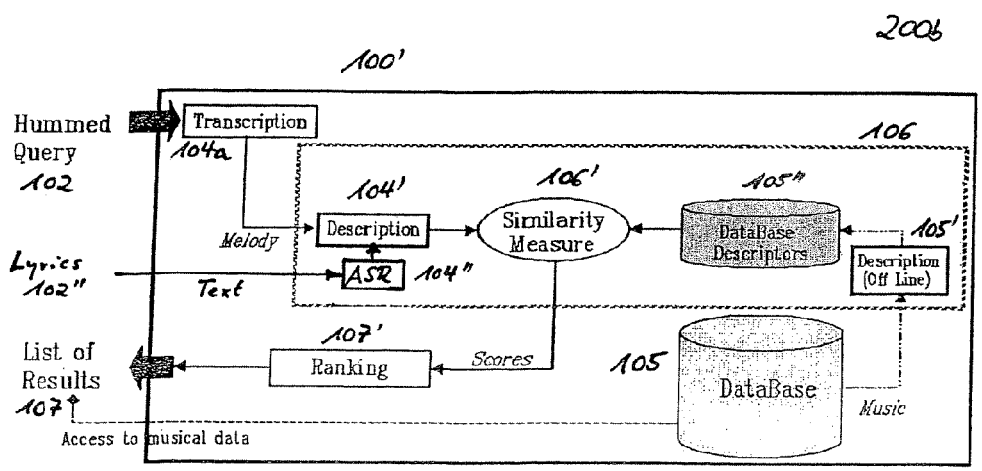
Figure 6:
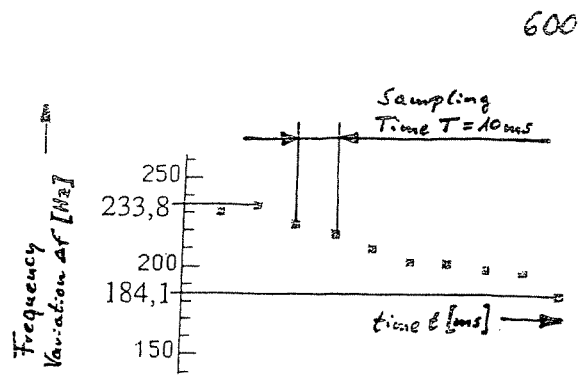
FIG. 6 is a diagram showing the frequency variation $\Delta f$ (in Hz) versus time t (in ms) for a single hummed note at a sampling rate $f_s$ of 100 Hz.
Figures 7A, 7B, 7C, 7D, 7E, 7F, 7G:
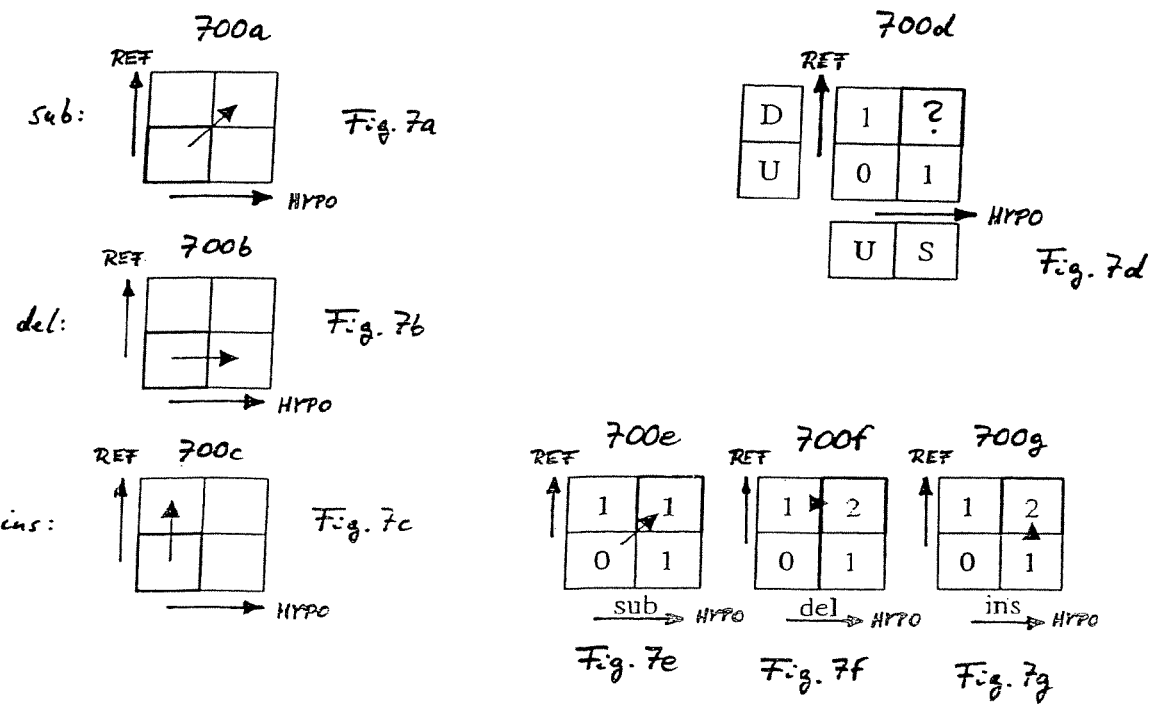
FIG. 7a shows an (N−1)×(N−1) alignment matrix D (here with N=3) whose components $d_{ij}$ are the accumulated cost factors for the differences between a hypothesis melody HYPO consisting of N notes whose intervals and/or interval directions $Dh_i$ (with $Dh_i$ 68 (U, D, S} and i=0, 1, 2, ..., N−2) are set as the i-coordinates for the columns of said matrix and a hummed reference melody REF consisting of N notes whose intervals and/or interval directions $Dr_j$ (with $Dr_j \in$ (U, D, S} and j=0, 1, 2, ..., N−2) are set as the j-coordinates for the rows of said matrix, that illustrates a substitution operation with a cost factor $w(a_i, b_j)=1$, FIG. 7b shows the (N−1)×(N−1) alignment matrix D as described above, which illustrates a deletion operation with a cost factor $w(a_{i, 0)}=1$, FIG. 7c shows the (N−1)×(N−1) alignment matrix D as described above, which illustrates an insertion operation with a cost factor $w(0, b_j)=1$, FIG. 7d shows an example for a 2×2 alignment matrix D whose components $d_{ij}$ are the accumulated cost factors for the differences between a hypothesis melody HYPO consisting of three notes whose intervals and/or interval directions $Dh_0$="U" and $Dh_1$="S" are set as the i-coordinates for the columns of said matrix and a hummed reference melody REF consisting of three notes whose intervals and/or interval directions $Dr_0$="U" and $Dr_1$="D" are set as the j-coordinates for the rows of said matrix, FIG. 7e shows the 2×2 alignment matrix D as described above having the components $d_{0,0}=0$, $d_{1,0}=1$, and $d_{0,1}=1$, which illustrates a substitution operation with the cost factor $w(a_i, b_j)=1$, FIG. 7f shows the 2×2 alignment matrix D as described above having the components $d_{0,0}=0$, $d_{1,0}=1$, and $d_{0,1}=1$, which illustrates a deletion operation with the cost factor $w(a_i, 0)=1$, FIG. 7g shows the 2×2 alignment matrix D as described above having the components $d_{0,0}=0$, $d_{1,0}=1$, and $d_{0,1}=1$, that illustrates an insertion operation with the cost factor $w(0, b_j)=1$, FIG. 8a shows an example for a filled 8×8 alignment matrix D whose components $d_{ij}$ are the accumulated cost factors for the differences between a hypothesis melody HYPO consisting of nine notes whose interval directions are set as the i-coordinates for the columns of said matrix and a hummed reference melody REF consisting of nine notes whose interval directions are set as the j-coordinates for the rows of said matrix, FIG. 8b shows the filled 8×8 alignment matrix D as described above and the optimal way with the minimal total cost (sketched as a broken line), that is found by going backward from the (7,7)- to the (0,0)-element through said matrix according to the dynamic time warping (DTW) algorithm, FIG. 8c is a table showing the intervals and/or interval directions $Dh_i$ and $Dr_j$ of the hummed reference melody REF and the found hypothesis melody HYPO, respectively, as well as the output sequences of the DTW alignment function—the tag elements (DTAGS) which denote matching interval directions (C) and interval directions which have to be deleted (D), inserted (I) or substituted (S) as well as the cost factors $w(a_i, b_j)$, FIG. 9 is a three-dimensional representation of N sung melodies, wherein the UDS codes representing the intervals and/or interval directions of said melodies are applied to a first axis (H-axis) and the recognized phonemes of the song lyrics are applied to a second axis (S-axis) of a Cartesian coordinate system, wherein the time is applied to a third axis (t-axis) of said coordinate system, FIGS. 9a+b show two parts of a flow chart illustrating a method for processing queries in the form of analog audio sequences, FIGS. 10a-c′ show five parts of a flow chart illustrating a detailed method for processing queries in the form of analog audio sequences by performing a first Viterbi search algorithm on a first two-dimensional search space having a time dimension and one dimension for an appropriate coding (e.g. Hidden-Markov Models, HMMs) of acoustic-phonetic speech characteristics and a second Viterbi search algorithm on a second two-dimensional search space having a time dimension and one dimension for an appropriate coding of musical key characteristics, and FIGS. 11a-c show three parts of a flow chart illustrating a detailed method for processing said queries by performing a single Viterbi search algorithm on a three-dimensional search space having a time dimension (t), one dimension (S) for an appropriate coding (e.g. Hidden-Markov Models, HMMs) of acoustic-phonetic speech characteristics and a further dimension (H) for an appropriate coding of musical key characteristics.

A first embodiment of the present invention refers to a content-based music information retrieval system as depicted in FIG. 2b for processing queries in the form of analog audio sequences 102 or 300a encompassing recorded parts of sung, hummed or whistled tunes 102, recorded parts of a melody 300a played on a musical instrument and/or a speaker's recorded voice 400 articulating parts of a song's lyrics 102" to retrieve textual background information about a music file stored in an integrated database 103 and/or 105 of said music information retrieval system after having analyzed and recognized said audio sequence 102 or 300a. Thereby, said music information retrieval system can comprise a microphone 101 for recording (S1) the analog audio sequences 102 or 300a, an automatic music classifying (recognition) system 100' for extracting (S2a), analyzing (S2b) and recognizing (S2c) musical key characteristics from the analog audio sequences 102 or 300a, wherein said key characteristics comprise e.g. the semitone numbers of the particular notes, the intervals and/or interval directions of the melody and the time values of the notes and pauses the rhythm of said melody is composed of, the key, beat, tempo, volume, agogics, dynamics, phrasing, articulation, timbre and instrumentation of said melody, the harmonies of accompaniment chords and/or electronic sound effects generated by said musical instrument, and an automatic speech recognition system 104" for extracting (S4a) and analyzing (S4b) acoustic-phonetic speech characteristics of the speaker's voice and pronunciation from spoken parts 400 of the recorded song's lyrics 102" and for recognizing (S4c) syntax and semantics of said lyrics 102".

A matching engine 106 is used for calculating (S3a) a similarity measure indicating the similarity of melody and lyrics of an audio sequence 102 or 300a compared to melody and lyrics of various music files previously stored in said database 103 and/or 105 by performing a Viterbi search algorithm on a three-dimensional search space. After that, said matching engine 106 generates (S3b) a ranked list 107 of the retrieved music files.

According to the invention, said 3D search space has a first dimension (t) for the time, a second dimension (S) for an appropriate coding of the acoustic-phonetic speech characteristics and a third dimension (H) for an appropriate coding of the musical key characteristics.

It is thus proposed to merge two systems into one: a speech recognizer and a QbH system. These two systems are used to process mixed input data (speech and/or music), e.g. in case a user sings the first line of a song's lyrics and continues by humming "da, da, da" because he/she does not know the remainder of the lyrics by heart but only the melody of said song. The evaluation of an unknown input to the system is then done by said three-dimensional Viterbi search. This algorithm integrates both approaches into a hybrid system that operates as good as any of the two basic systems if the input is pure speech or pure humming but provides better accuracy if the input is of a mixed type (e.g. partial humming and singing or partial humming and partial speaking). As the nature of the input data (speech or humming) is determined implicitly when the evaluation is done, no prior knowledge about the nature (type) of the input data is necessary.

Figure 9A:
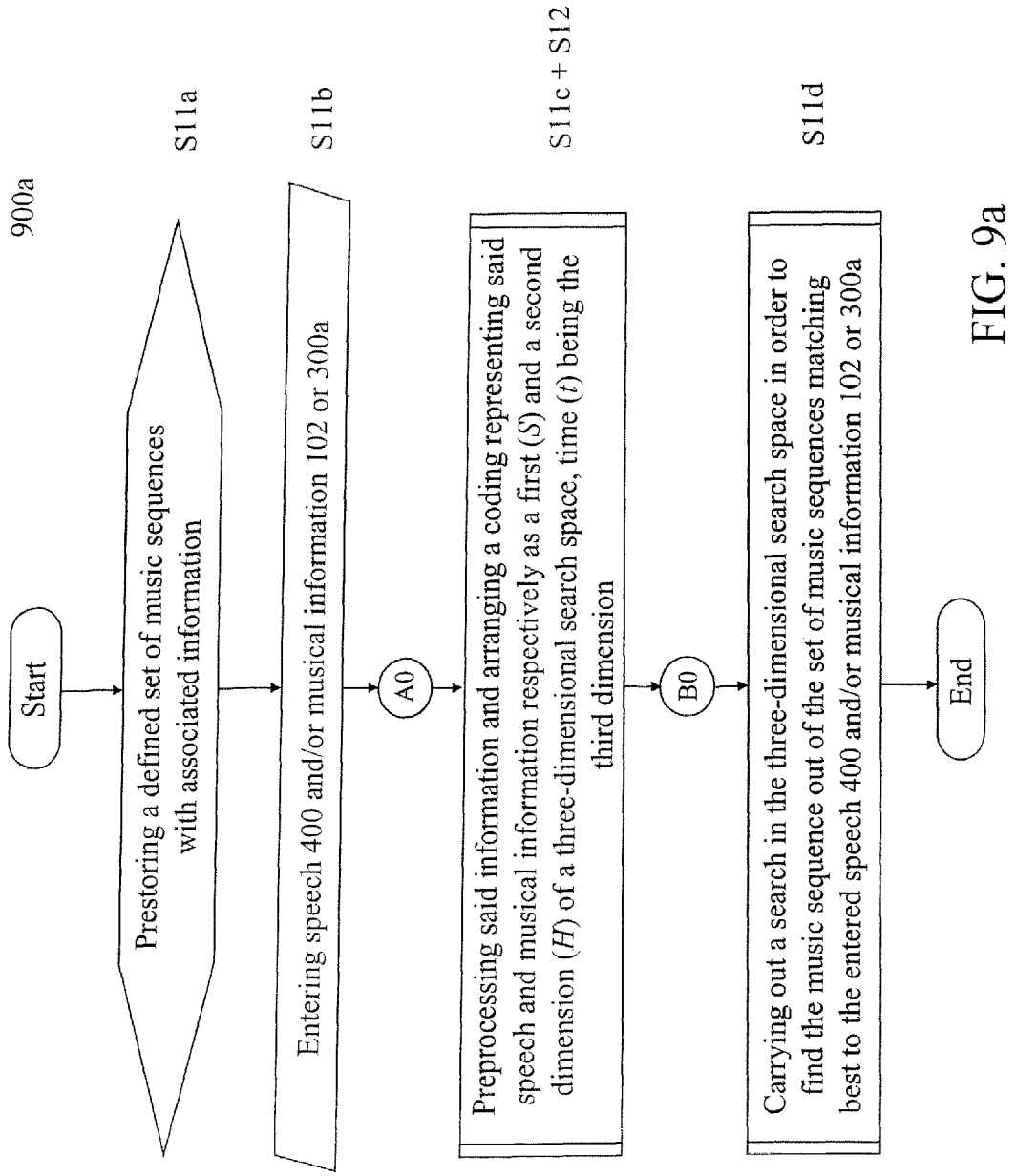
Figure 9B:
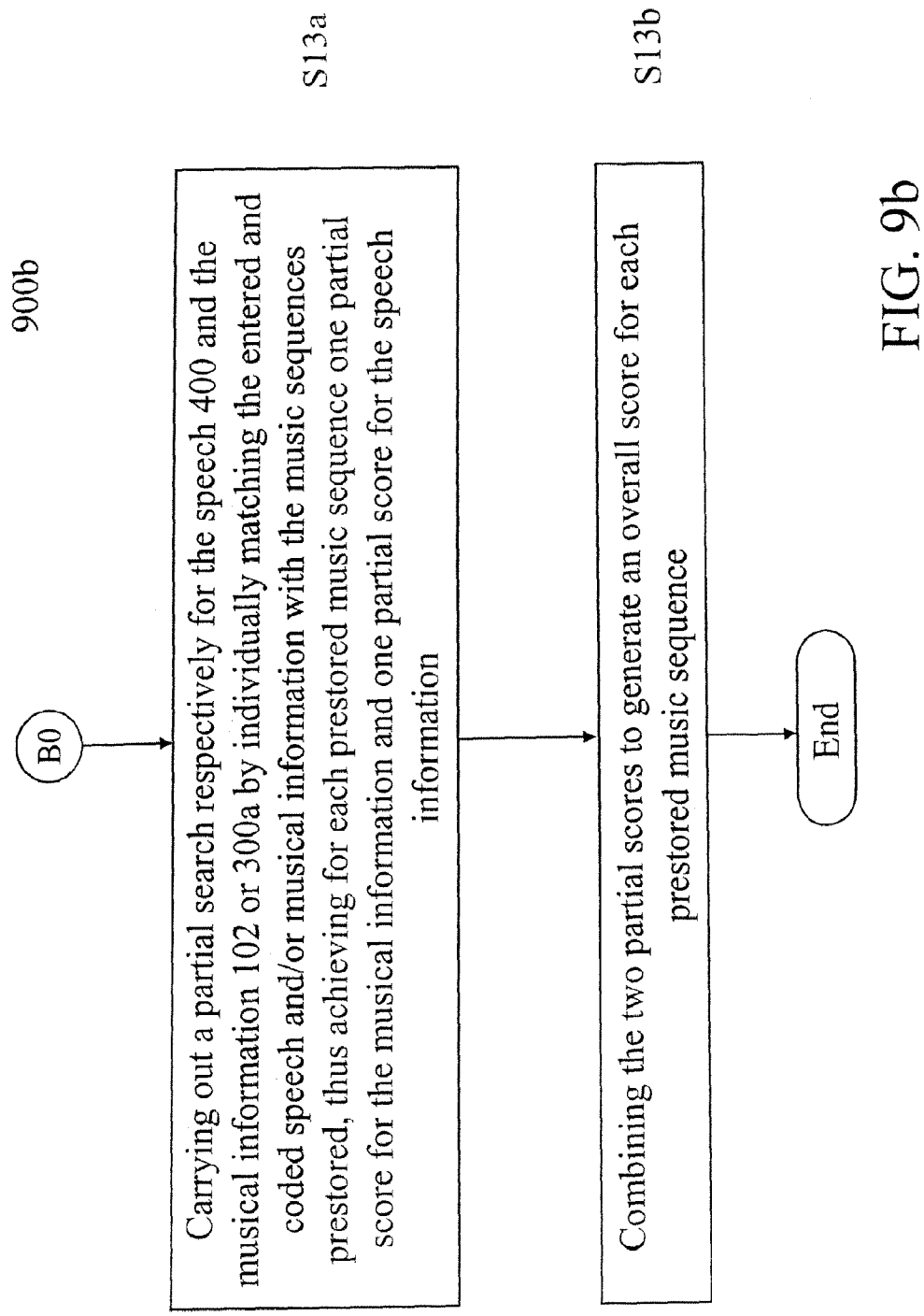

This is achieved by using the three-dimensional search space as depicted in FIG. 9 instead of the commonly used two-dimensional search space. As already explained shortly before, one axis of the search space is the time axis, the second one is used for the phonemes of the individual words that constitute the song titles, and the third dimension is made up of an appropriate coding of tonal information, e.g. a coding that describes the relative pitch difference in semitones between the pitch levels of the notes of a hummed melody.

Note that this coding is only an illustrative example and the invention does not depend on the specific way of such a coding.

When input data is received by the proposed QbH system, there are two independent preprocessings being computed, one for speech recognition and one for query-by-humming, and the found notes are translated into the chosen coding. The two preprocessing steps result in two feature vectors respectively computed over time.

If the time axis (dimension) is labeled with 't', the speech recognition phoneme axis with 'S', and the query by humming axis (dimension) with 'H', the search is carried out in the three-dimensional space (t;S,H). Basically, the best path leading from the point (0,0,0) to the point $(T,S_j,H_j)$ has to be found, where $S_j$ denotes a state of the word j from a song's lyrics on the S-axis, and $H_j$ denotes a state of the tone sequences on the H-axis. It should be noted that neither $S_j$ nor $H_j$ have to denote final states of the respective word or tone sequence, respectively, since it is possible for a user to hum only a part of a melody or say just a part of the song title.

The decoding process for the pitch information is the same as the one for a typical QbH system: a Viterbi search—e.g. a dynamic time warping (DTW) algorithm—can be used to find the best alignment between the previously stored reference songs and the hummed melody.

For the speech information a very similar decoding process, comparable to the standard speech recognizer, can be carried out. The main difference to a standard automatic speech recognizer (ASR) is that all syllables in all words of all songs have an alternative pronunciation 'da'. For example, the pronunciation for the famous Beatles song "Yesterday" can be either "j E s t 6 d E I" or "da da da", In other words, there exists a pronunciation variant for every word that is just a sung "da da da" version of that word. This is done since in practice there are many people that do not know the complete lyrics of a song, even if they know the melody. They know, however, part of the lyrics. This yields input to the QbH system of the following type:

"At the rivers of Babylon, da, da, da, da—da, da, da, da, when we remember da, da, da", wherein at least the "da da da" passages are hummed (sung) to the tune of the corresponding song. If a grammar-based speech recognizer is used and on the assumption that the user does not—as in the example above—know part of the lyrics, a few words are missed and a few others are known, but instead of knowing only a part of the lyrics and after that part will knowing only the melody, the grammar can be extended in such a way that additional allowed transitions from every word of the lyrics into a repeated 'da' state are inserted. The advantage of this approach is a significantly simplified ASR algorithm in the case of pure humming because all the lyrics are pruned away and only the 'da' state remains active, whereas in the case of many pronunciation variations to the individual words all the words are pursued independently such that no effective pruning can take place.

So far, the H-axis and the S-axis of the search space can be treated independently from each other, and in this respect the entire system is just a combination of a standard speech recognizer with additional 'da' words and a QbH system. To increase the efficiency, however, according to the present invention it is proposed to link these two systems during the search procedure, particularly at asynchronous time intervals, e.g. every third hummed tone. This linking step is basically a cross-pruning step, which means that during the linking step the current best partial path score for a given song melody (e.g. the melody of the Beatles song "Yesterday"), as taken from the H-axis, is combined with the best partial path score for the lyrics for the same song (as taken from the S-axis). Then, this combined score is compared with all other combined scores for all other song melodies (which have also been combined with their respective lyrics counterparts). Again, a pruning step is carried out, where all combined scores are compared to each other and the best scoring one plus all scores which differ only by a probability difference $\Delta P_C$ from this best one are retained and all the others are pruned. The same pruning can also be used for the items on the S-axis. Therefore, one pruning step both prunes the S-axis hypothesis and the H-axis hypothesis, which results in a reduced number of active hypotheses after this time. By this combination, the following goals (cases A-D) can be achieved:

In the following, it shall be assumed that the user sings a song from the beginning to the end. In this case, information from both the lyrics and the melody is available, and the decoding is carried out both along the S- and the H-axis. Since there is a match in both dimensions, the linking pruning will be particularly effective since two low probabilities are combined for the correct song, whereas for any other song either the lyrics are very different—giving a much lower probability on the S-axis—or the melody is, which gives a much lower probability on the H-axis (or both melody and lyrics are). Since S- and H-probabilities are combined, the combined probability will also be much lower than the combined probability of every other song, and the pruning can be very efficient. As a result, the combined ASR and QbH system can effectively combine both knowledge sources and profit from both, while speeding up the decoding process by being able to weed out less promising hypotheses.

Further it is be assumed that the user hums a song by repeating "da da da" instead of singing or speaking the song's lyrics because he/she does not know the lyrics but the melody. In this case, the information on the S-axis is very unclear. In the case of a grammar having a repeated 'da' state, only this state will remain active after a short period of time since all the more complex lyrics will be pruned away. This means that all the different songs give the same score on the S-axis. The search along the H-axis is performed normally like in a standard QbH system. In the linking step, the information from the humming is combined with worthless information from the lyrics—since all probabilities are equal there—and the linking does not help the pruning of the H-axis. The system thus runs as a pure QbH system with a little additional effort from the decoding of the S-axis, which is not much since only a single hypothesis is pursued on the S-axis.

In the following, it is assumed that the user just says the song title without humming the melody of said song. Then, the same situation as described above in B) occurs, with the S-axis and the H-axis interchanged, which means that the whole decoding takes place on the S-axis and the H-axis does not provide any additional information, resulting in a pure ASR system with a small overhead.

Finally, it is assumed that the user speaks or hums part of the lyrics—the part he knows—and hums the rest "da da da", In this case, there is a combination of cases A) and B). For the first part of the song, the efficient pruning that has been described in A) is present. For the second part, still fully utilizing the information from the humming but no longer have any information from the lyrics such that the linking steps result in a pure QbH system which starts on an already strongly reduced set of alternatives (from the efficient linking pruning in the combined lyrics/humming part).

The system is thus capable of treating all kinds of mixed input with little overhead and provides an effective decoding for the fully mixed input data of type A). As a further advantage, the system is able to handle input data which change their characteristics over time (e.g. spoken lyrics with partly humming of the melody as in case D).

A method for retrieving music information based on audio input (102, 300a) according to the proposed approach of the present invention is illustrated in two parts of a flow chart which is depicted in FIGS. 9a+b. Said method comprises the steps of prestoring (S11a) a defined set of music sequences with associated information, entering (S11b) speech information 400 and/or music information 102 or 300a and arranging (S11c) a coding representing said speech and music information respectively as a first (S) and a second dimension (H) of a three-dimensional search space, time (t) being the third dimension and executing (S11d) a Viterbi search in the three-dimensional search space in order to find the music sequence out of the set of music sequences matching best to the entered speech and/or music information.

Before being represented as a coding in the three-dimensional search space, said speech information 400 and/or said music information 102 or 300a is individually pre-processed (S12).

According to the invention, said step of carrying out (S11d) said Viterbi search comprises the steps of carrying out (S13a) a partial search respectively for said speech information 400 and said music information 102 or 300a by individually matching the entered and coded speech and/or music information with the music sequences prestored, thus achieving for each prestored music sequence one partial score for the music information and one partial score for the speech information, and combining (S13b) the two partial scores to generate an overall score for each prestored music sequence.

Figure 10A:
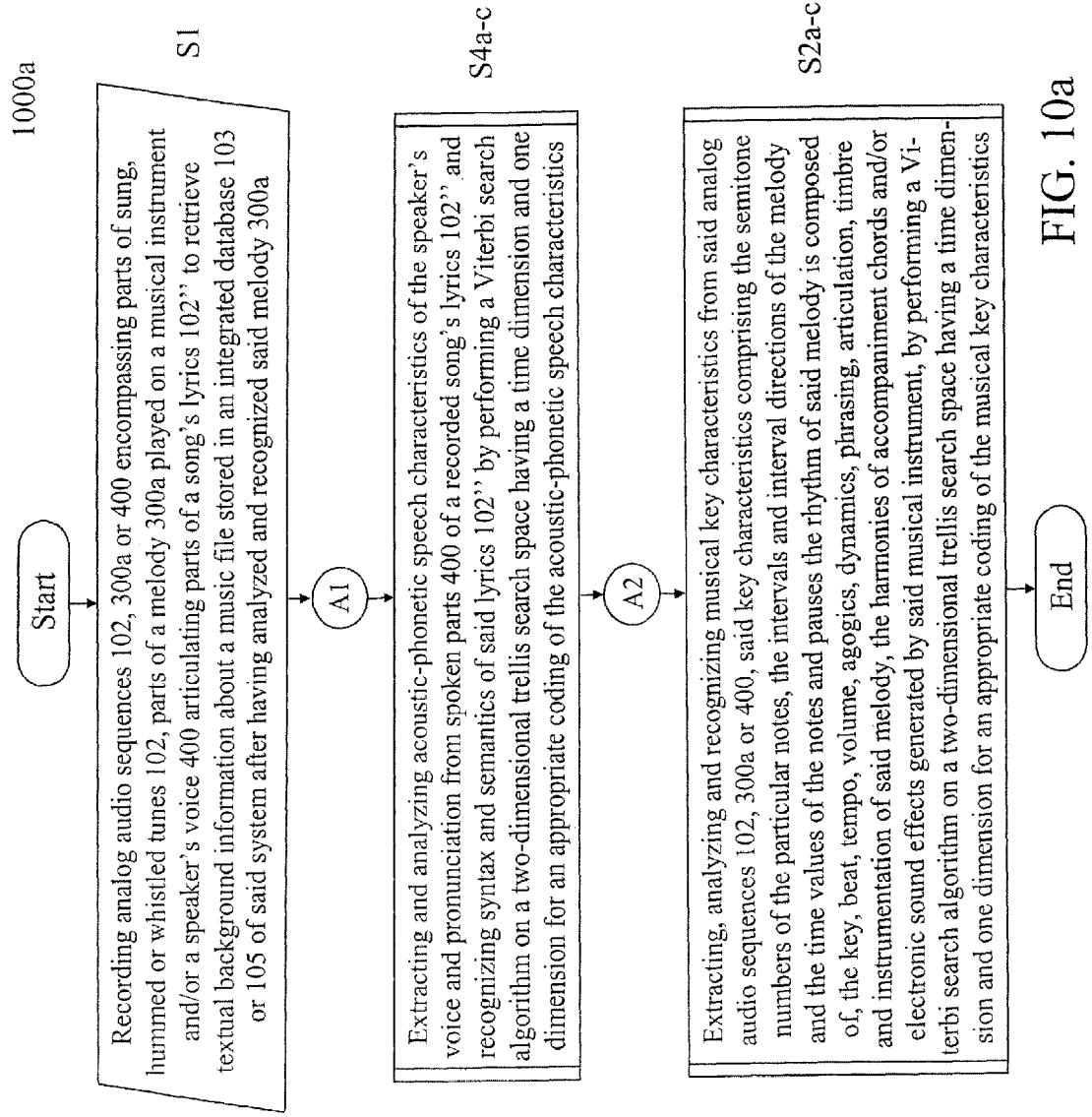

The invention further pertains to a method for processing queries in the form of analog audio sequences 102, 300a and/or 400 encompassing recorded parts of sung, hummed or whistled tunes 102, recorded parts of a melody 300a played on a musical instrument and/or a speaker's voice 400 articulating parts of a song's lyrics 102" to retrieve textual background information about a music file stored in an integrated database 103 or 105 of said system after having analyzed and recognized said melody 300a. As shown in FIG. 10a, said method comprises the following steps:

recording (S1) said analog audio sequences 102, 300a and/or 400, extracting (S4a) and analyzing (S4b) acoustic-phonetic speech characteristics of the speaker's voice and pronunciation from spoken parts of a recorded song's lyrics 102" and recognizing (S4c) a transcription of said lyrics 102" by performing a Viterbi search algorithm on a two-dimensional search space having a time dimension and one dimension for an appropriate coding of the acoustic-phonetic speech characteristics, and extracting (S2a), analyzing (S2b) and recognizing (S2c) musical key characteristics from said analog audio sequences 102, 300a and/or 400, wherein said key characteristics are those described above, by performing a Viterbi search algorithm on a two-dimensional search space having a time dimension and one dimension for an appropriate coding of the musical key characteristics.

Figure 10B:
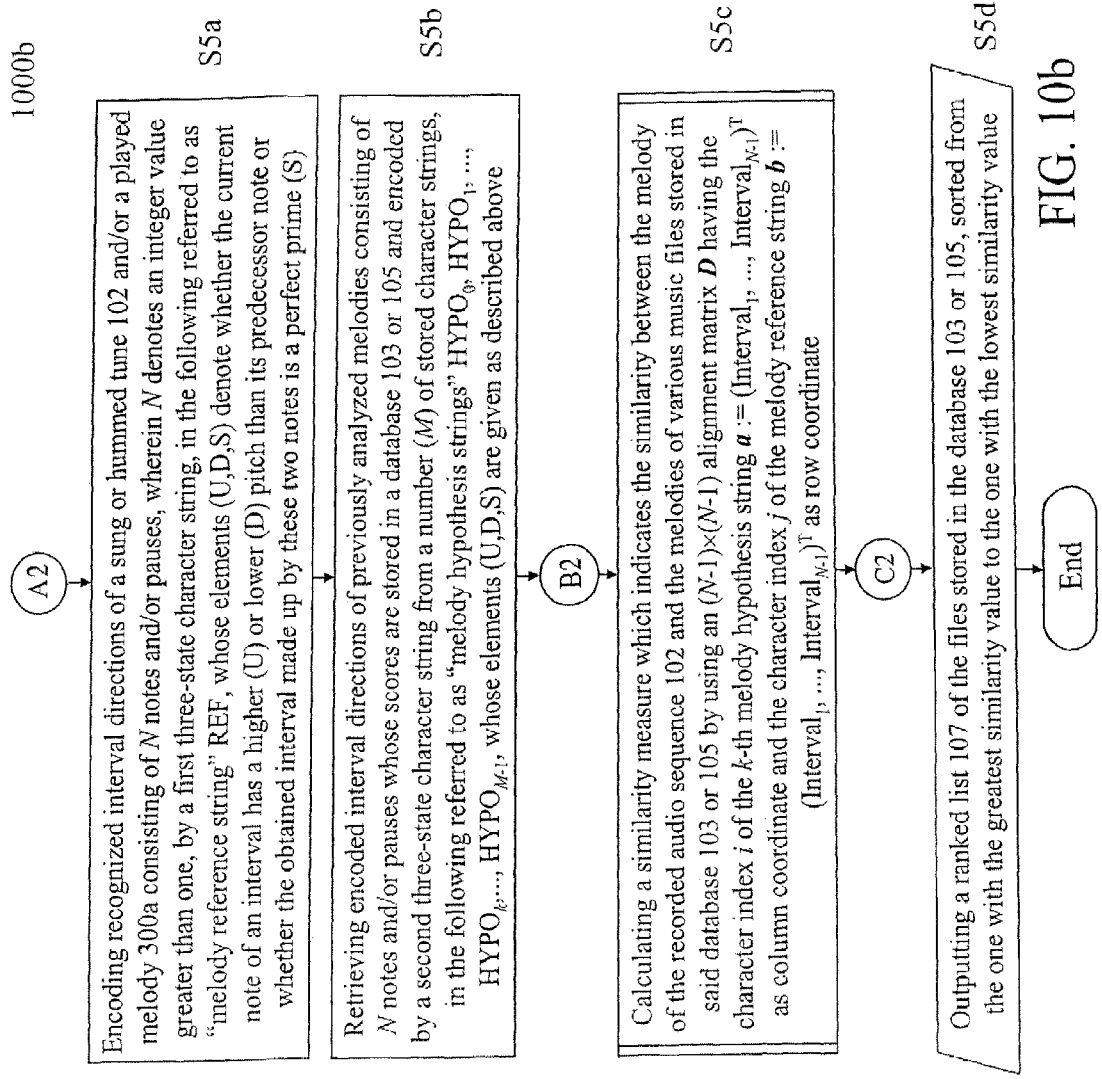
Figure 10B:
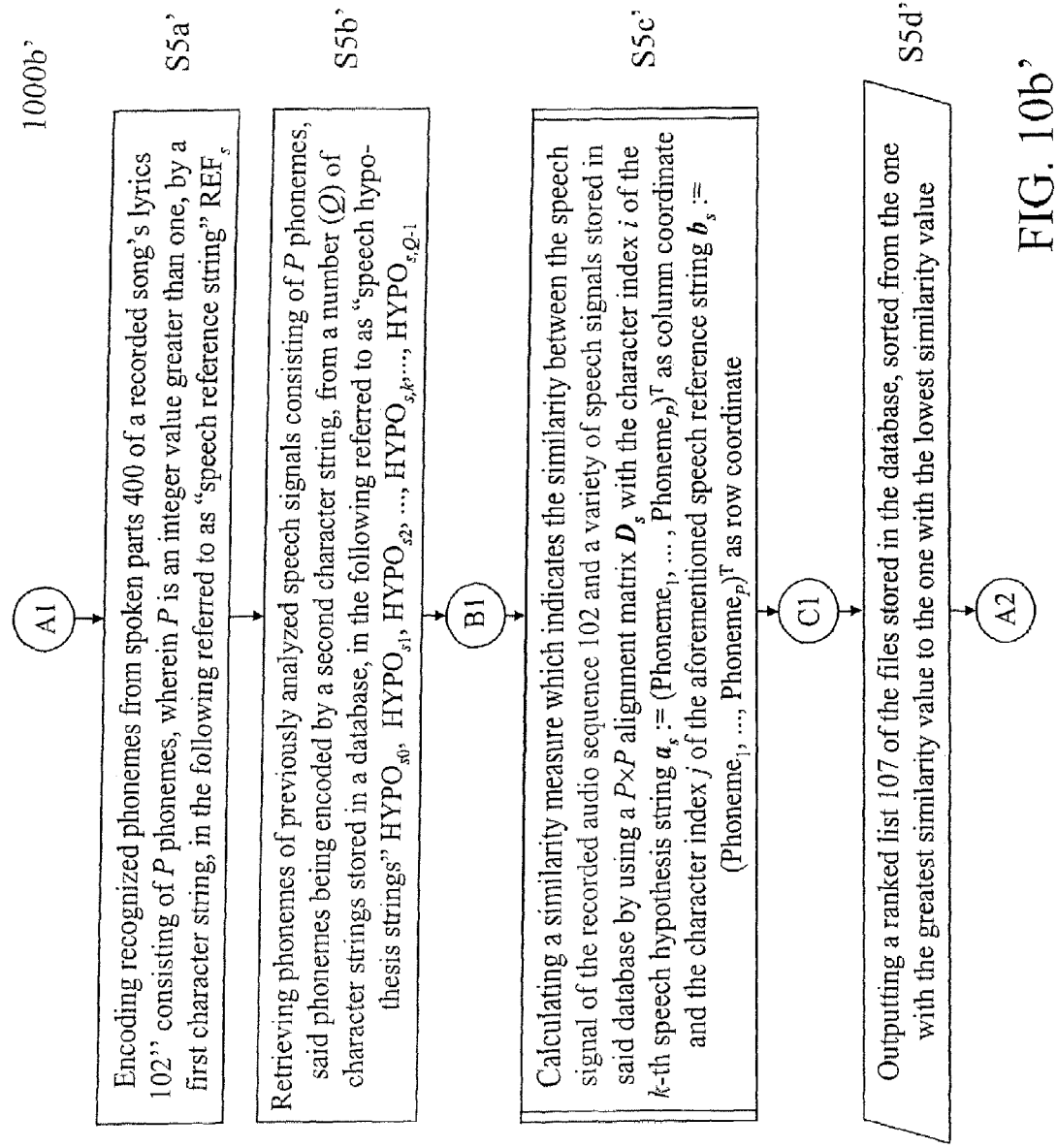

A detailed flow chart 1000b illustrating the steps of extracting (S2a), analyzing (S2b) and recognizing (S2c) said musical key characteristics is depicted in FIG. 10b. First, recognized intervals and/or interval directions of a sung or hummed tune 102 and/or a played melody 300a consisting of N notes and/or pauses, wherein N denotes an integer value greater than one, are encoded (S5a) by a first three-state character string, in the following referred to as "melody reference string" REF, whose elements (U,D,S) denote whether the current note of an interval has a higher (U) or lower (D) pitch than its predecessor note or whether the obtained interval made up by these two notes is a perfect prime (S). Alternatively, said intervals can be encoded by any other appropriate type of coding. After that, encoded intervals and/or interval directions of previously analyzed melodies consisting of N notes and/or pauses whose scores are stored in a database 103 or 105 and encoded by a second three-state character string are retrieved (S5b) from a number (M) of stored character strings, in the following referred to as "melody hypothesis strings"

$$HYPO_0, HYPO_1, \ldots, HYPO_k, \ldots, HYPO_{M-1},$$

whose elements (U,D,S) are given as described above. Again, said intervals can be encoded by using any other appropriate type of coding. The system then calculates (S5c) a similarity measure which indicates the similarity between the melody of the recorded audio sequence 102 and the melodies of various music files stored in said database 103 or 105 by using an (N−1)×(N−1) alignment matrix D having the character index i of the k-th melody hypothesis string $$a := (Interval_1, \ldots, Interval_{N-1})^T \in \{U,D,S\}^{N-1}$$

as column coordinate and the character index j of the melody reference string $$b := (Interval_1, \ldots, Interval_{N-1})^T \in \{U,D,S\}^{N-1}$$

as row coordinate. Finally, a ranked list 107 of the files stored in the database 103 and/or 105 is generated (S5d), sorted from the one with the greatest similarity value to the one with the lowest similarity value.

A detailed flow chart illustrating the steps of extracting (S4a) and analyzing (S4b) acoustic-phonetic speech characteristics is depicted in FIG. 10b'. First, recognized phonemes from spoken parts 400 of a recorded song's lyrics 102" consisting of P phonemes, wherein P is an integer value greater than one, are encoded (S5a') by a first character string, in the following referred to as "speech reference string" $REF_s$. After that, phonemes of previously analyzed speech signals consisting of P phonemes, said phonemes being encoded by a second character string, are retrieved (S5b') from a number (Q) of character strings stored in a database, in the following referred to as "speech hypo-thesis strings"

$$HYPO_{s0}, HYPO_{s1}, HYPO_{s2}, \ldots, HYPO_{s,k}, \ldots, HYPO_{s,Q-1}.$$

The system then calculates (S5c') a similarity measure which indicates the similarity between the speech signal of the recorded audio sequence 102 and a variety of speech signals stored in said database by using a P×P alignment matrix D, with the character index i of the k-th speech hypothesis string $$a_s := (Phoneme_1, \ldots, Phoneme_P)^T$$

as column coordinate and the character index j of the aforementioned speech reference string $$b_s := (Phoneme_1, \ldots, Phoneme_P)^T$$

as row coordinate. Finally, a ranked list 107 of the files stored in the database is generated (S5d'), sorted from the one with the greatest similarity value to the one with the lowest similarity value.

Figure 10C:
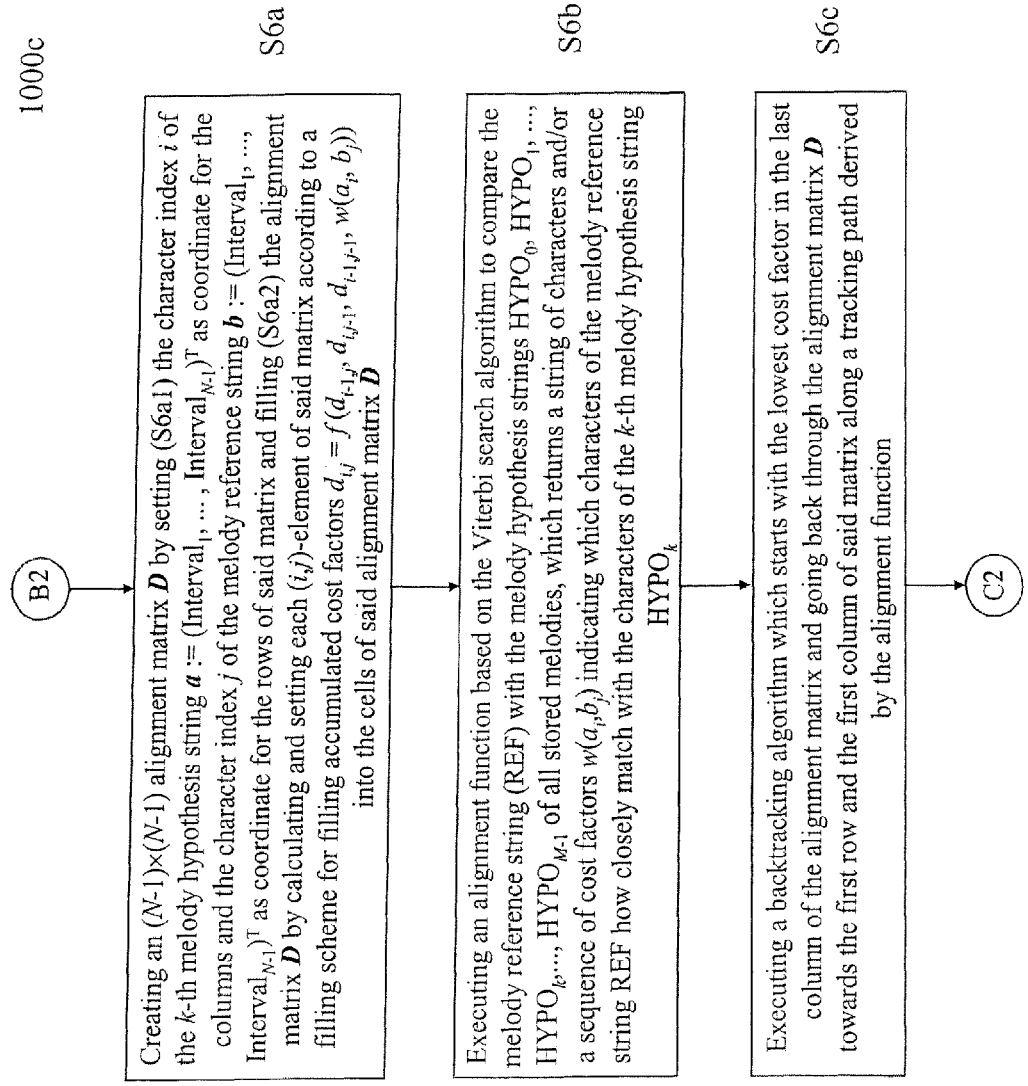
Figure 10C:
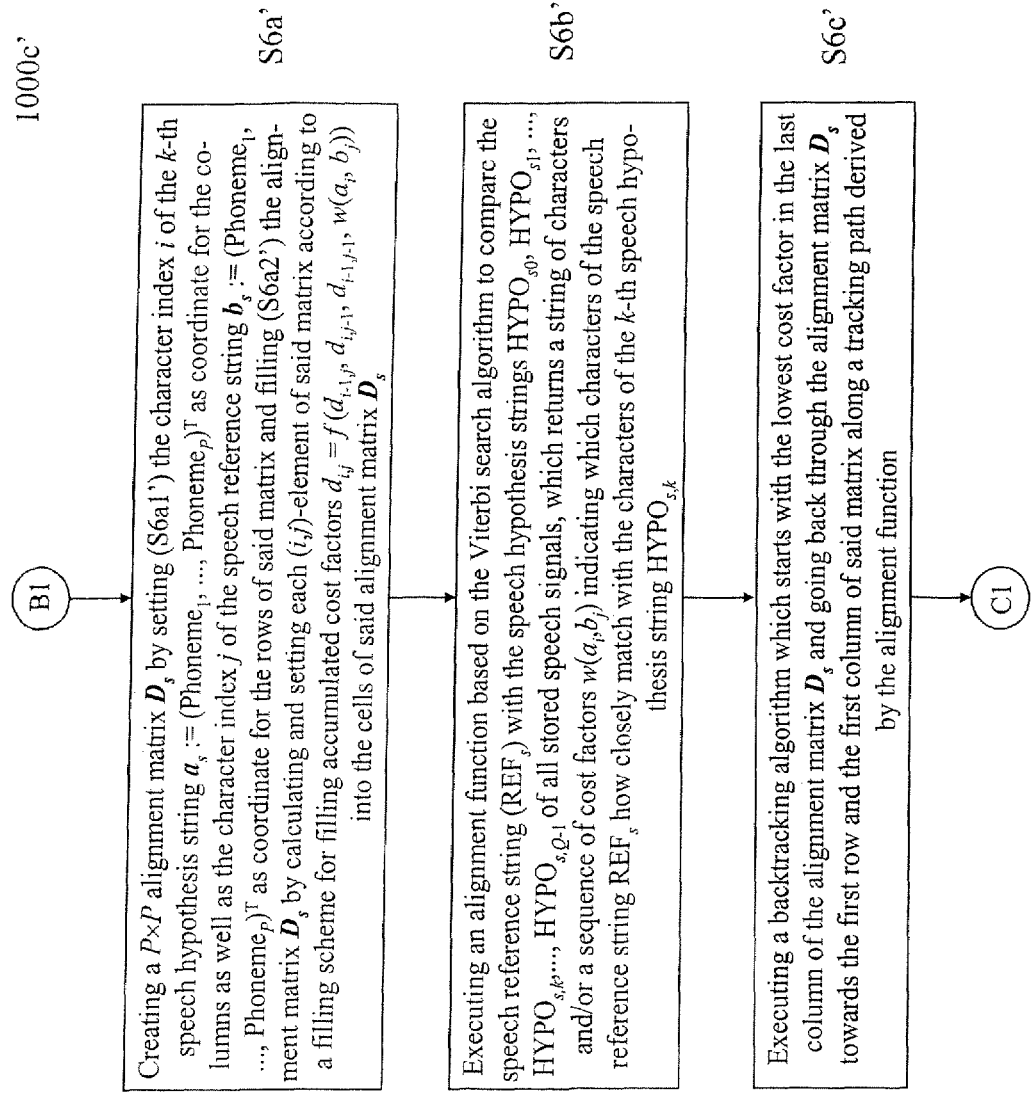

As shown in FIG. 10c, the step of calculating (S5c) said similarity measure indicating the similarity between the melody of the recorded audio sequence 102 and the melodies of various music files stored in said database 103 thereby comprises the following steps:

creating (S6a) an (N−1)×(N−1) alignment matrix D by setting (S6a1) the character index i of the k-th melody hypothesis string $a := (Interval_1, \ldots, Interval_{N-1})^T$ as coordinate for the columns and the character index j of the melody reference string $b := (Interval_1, \ldots, Interval_{N-1})^T$ as coordinate for the rows of said matrix and filling (S6a2) the alignment matrix D by calculating and setting each (i,j)-element of said matrix according to a filling scheme used for filling $(N-1)^2$ accumulated cost factors $d_{i,j} = f(d_{i-1,j}, d_{i,j-1}, d_{i-1,j-1}, w(a_i, b_j))$ into the cells of said alignment matrix D, executing (S6b) an alignment function based on the Viterbi search algorithm to compare the melody reference string (REF) with the melody hypothesis strings $HYPO_0, HYPO_1, \ldots, HYPO_k, \ldots, HYPO_{M-1}$, of all stored melodies, which returns a string of characters and/or a sequence of cost factors $w(a_i, b_j)$ indicating which characters of the melody reference string REF how closely match with the characters of the k-th melody hypothesis string $HYPO_k$, and executing (S6c) a backtracking algorithm which starts with the lowest cost factor in the last column of the alignment matrix D and goes back through the alignment matrix towards the first row and the first column of said matrix along a tracking path derived by the alignment function.

As shown in FIG. 10c', the step of calculating (S5c') a similarity measure indicating the similarity between the speech signal of the recorded audio sequence 102 and all the stored speech signals thereby comprises the following steps:

creating (S6a') a P'P alignment matrix D, by setting (S6a1') the character index i of the k-th speech hypothesis string $a_s := (Phoneme_1, \ldots, Phoneme_P)^T$ as coordinate for the columns as well as the character index j of the speech reference string $b_s := (Phoneme_1, \ldots, Phoneme_P)^T$ as coordinate for the rows of said matrix and filling (S6a2') the alignment matrix D, by calculating and setting each (i,j)-element of said matrix according to a filling scheme for filling $P^2$ accumulated cost factors $d_{i,j}$ into the cells of said alignment matrix $D_s$, executing (S6b') an alignment function based on the Viterbi search algorithm to compare the speech reference string ($REF_s$) with the speech hypothesis strings $HYPO_{s0}, HYPO_{s1}, \ldots, HYPO_{s,k}, \ldots, HYPO_{s,Q-1}$ of all stored speech signals, which returns a string of characters and/or a sequence of cost factors $w(a_i, b_j)$ indicating which characters of the speech reference string $REF_s$ how closely match with the characters of the k-th speech hypothesis string $HYPO_{s,k}$, and executing (S6c') a backtracking algorithm which starts with the lowest cost factor in the last column of the alignment matrix $D_s$ and goes back through the alignment matrix towards the first row and the first column of said matrix along a tracking path derived by the alignment function.

According to a still further embodiment of the present invention, said method comprises the steps of calculating (S9c) a similarity measure indicating the similarity of melody and lyrics of the recorded audio sequence 102 or 300a compared to melody and lyrics of various music files stored in said database 103 or 105 by performing a Viterbi search algorithm on a three-dimensional search space, said search space having a first dimension (t) for the time, a second dimension (S) for an appropriate coding of the acoustic-phonetic speech characteristics and a third dimension (H) for an appropriate coding of the musical key characteristics, and generating (S9d) a ranked list 107 of said music files. Thereby, acoustic-phonetic speech characteristics of a speaker's voice and pronunciation as well as musical key characteristics of a sung, whistled or hummed tune 102 and/or a played melody 300a are simultaneously extracted (S8a), analyzed (S8b) and recognized (S8c).

Figure 11A:
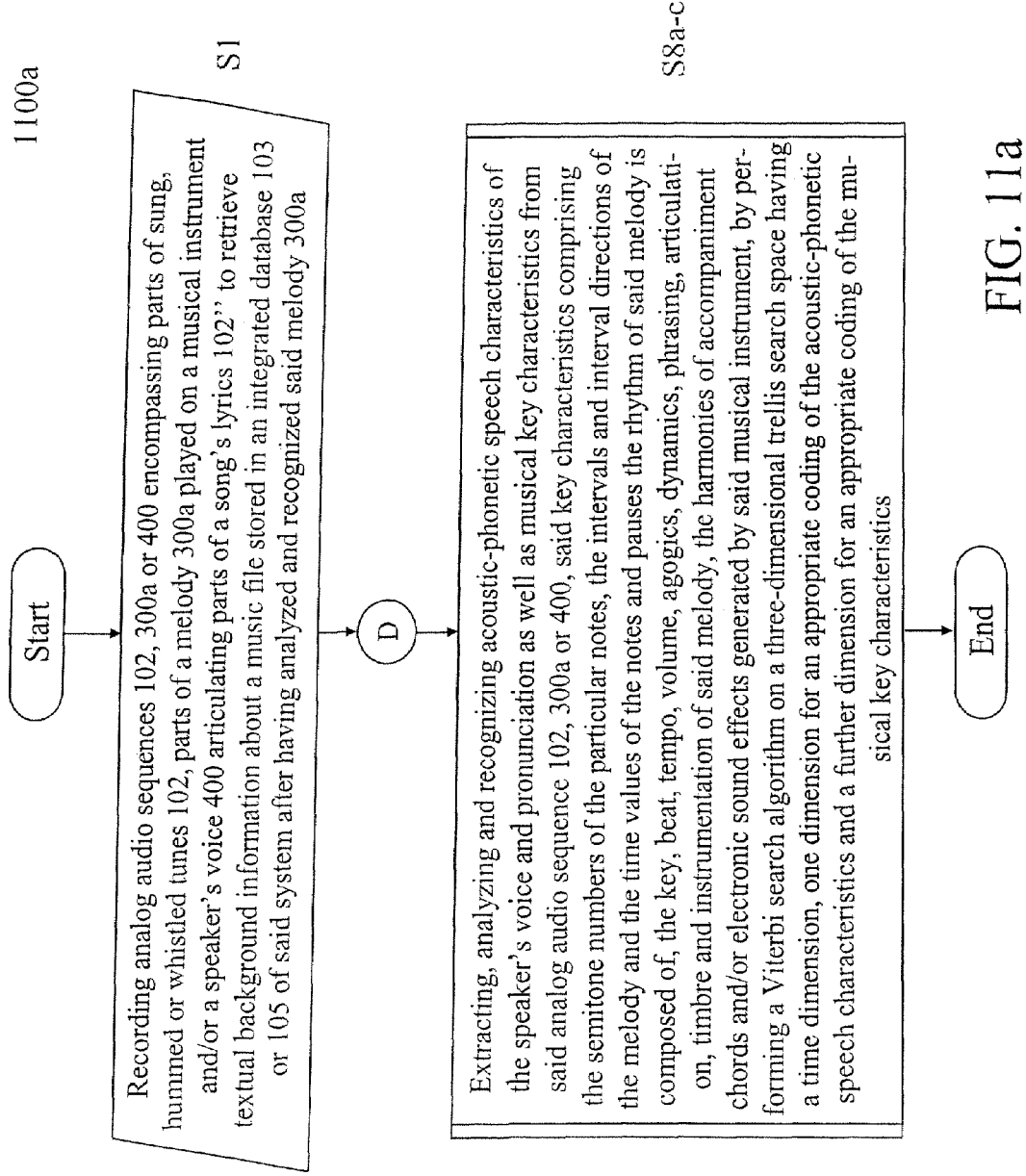
Figure 11B:
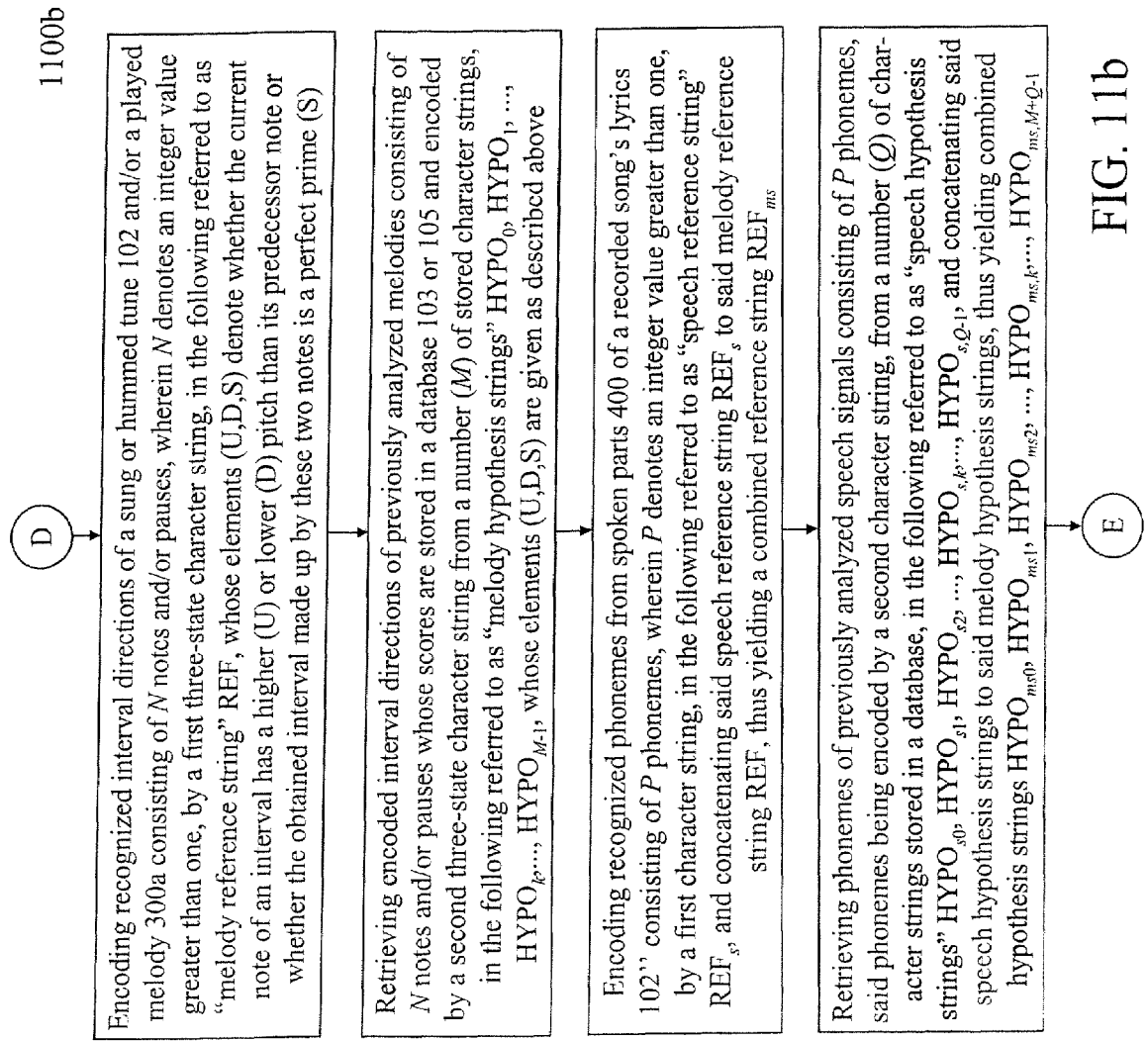

A detailed flow chart 1100b illustrating the steps of extracting (S8a), analyzing (S8b) and recognizing (S8c) said acoustic-phonetic speech characteristics as well as said musical key characteristics is depicted in FIG. 11b. First, recognized interval directions of a sung or hummed tune 102 and/or a played melody 300a consisting of N notes and/or pauses, wherein N denotes an integer value greater than one, are encoded (S5a) by a first character string, in the following referred to as "melody reference string" (REF), whose elements denote the intervals between said notes and/or the directions of said intervals. After that, encoded intervals and/or interval directions of previously analyzed melodies consisting of N notes and/or pauses whose scores are stored in a database 103 or 105 and encoded by a second character string are retrieved (S5b) from a number (M) of stored character strings, in the following referred to as "melody hypothesis strings"

$$HYPO_0, HYPO_1, \ldots, HYPO_k, \ldots, HYPO_{M-1},$$

whose elements are given as described above. Likewise, recognized phonemes from spoken parts 400 of a recorded song's lyrics 102" consisting of P phonemes, wherein P denotes an integer value greater than one, are encoded (S9a) by a first character string, in the following referred to as "speech reference string" (REF$_s$), and concatenated to said melody reference string REF, thus yielding a combined reference string REF$_{ms}$. Furthermore, phonemes of previously analyzed speech signals consisting of P phonemes, said phonemes being encoded by a second character string, are retrieved (S9b) from a number (Q) of character strings stored in a database, in the following referred to as "speech hypothesisstrings"

$$HYPO_{s0}, HYPO_{s1}, HYPO_{s2}, \ldots, HYPO_{s,k}, \ldots, HYPO_{s,Q-1},$$

and concatenated to said melody hypothesis strings, thus yielding combined hypothesis strings $$HYPO_{ms0}, HYPO_{ms1}, HYPO_{ms2}, \ldots, HYPO_{ms,k}, \ldots, HYPO_{ms,M+Q-1}.$$

The system then calculates (S9c) a similarity measure indicating the similarity between melody and lyrics of the recorded audio sequence 102 compared to melody and lyrics of a variety of music files stored in said database by using a single two-dimensional search space in form of an (N+P−1)×(N+P−1) alignment matrix D$_{ms}$ having the character index i of the k-th combined hypothesis string $$a_{ms} := (\text{Interval}_1, \ldots, \text{Interval}_{N-1}, \text{Phoneme}_1, \ldots, \text{Phoneme}_P)^T$$

as column coordinate and the character index j of the combined reference string $$b_{ms} := (\text{Interval}_1, \ldots, \text{Interval}_{N-1}, \text{Phoneme}_1, \ldots, \text{Phoneme}_P)^T$$

as row coordinate, and generates (S9d) a ranked list 107 of the files stored in the database, sorted from the one with the greatest similarity value to the one with the lowest similarity value.

As shown in FIG. 11c, the step of calculating (S9c) said similarity measure indicating the similarity between melody and lyrics of the recorded audio sequence 102 compared to melody and lyrics of the music files stored in said database 103 thereby comprises the following steps:

creating (S10a) an (N+P−1)×(N+P−1) alignment matrix D$_{ms}$ by setting (S6a1) the character index i of the k-th hypothesis string a$_{ms}$ as coordinate for the columns and the character index j of the reference string b$_{ms}$ as coordinate for the rows of said matrix and filling (S6a2) the alignment matrix D$_{ms}$ by calculating and setting each (i,j)-element of said matrix according to a filling scheme for filling accumulated cost factors $d_{i,j} = f(d_{i-1,j}, d_{i,j-1}, d_{i-1,j-1}, w(a_i, b_j))$ into the cells of said alignment matrix D$_{ms}$, executing (S10b) an alignment function based on the Viterbi search algorithm to compare the combined reference string REF$_{ms}$ with the combined hypothesis strings HYPO$_{ms0}$, HYPO$_{ms1}$, HYPO$_{ms2}$, . . . , HYPO$_{ms,k}$, . . . , HYPO$_{ms,M+Q-1}$ of all stored melodies and lyrics, which returns a string of characters and/or a sequence of cost factors $w(a_i, b_j)$ indicating which characters of the combined reference string REF$_{ms}$ how closely match with the characters of the k-th combined hypothesis string HYPO$_{ms,k}$, and executing (S10c) a backtracking algorithm which starts with the lowest cost factor in the last column of the alignment matrix D$_{ms}$ and goes back through the alignment matrix towards the first row and the first column of said matrix along a tracking path derived by the alignment function.

The elements $d_{i,j}$ of said alignment matrix D$_{ms}$ are calculated (S7) according to the following filling scheme:

$$d_{ij} := \min \begin{cases} d_{i-1,j} + w(a_i, 0) & \forall\, i, j \in \{1, 2, \ldots, N+P-1\} \quad (\text{case } \#1) \\ d_{i-1,j-1} + w(a_i, b_j) & \forall\, i, j \in \{1, 2, \ldots, N+P-1\} \quad (\text{case } \#2) \\ d_{i,j-1} + w(0, b_j) & \forall\, i, j \in \{1, 2, \ldots, N+P-1\} \quad (\text{case } \#3) \end{cases}$$

with the initial conditions $$d_{0,0} := 0,$$

$$d_{i,0} := d_{i-1,0} + w(a_i, 0) \ \forall\, i \in \{1, 2, 3, \ldots, N+P-1\}, \text{ and}$$

$$d_{0,j} := d_{0,j-1} + w(0, b_j) \ \forall\, j \in \{1, 2, 3, \ldots, N+P-1\},$$

wherein w(a$_i$, 0) is a cost factor associated with the deletion of the character a$_i$ of the k-th hypothesis string HYPO$_{ms,k}$ according to case #1, w(0, b$_j$) is a cost factor associated with the insertion of the character b$_j$ into the combined reference string REF$_{ms}$ according to case #3, and w(a$_i$, b$_j$) is a cost factor which is associated with the replacement of the element a$_i$ of the k-th combined hypothesis string HYPO$_{ms,k}$ by the element b$_j$ of the combined reference string REF$_{ms}$ according to case #2, wherein w(a$_i$, b$_j$) is set to zero if a$_i$=b$_j$ and set to a value greater than zero if a$_i$≠b$_j$.

Finally, a still further embodiment of the present invention pertains to a computer software program product implementing a method as described above when running on a computing device.

TABLE

Depicted Features and Their Corresponding Reference Signs

| No. | Technical Feature (System Component or Procedure Step) |
|---|---|
| 100' | query-by-humming (QbH) system according to the state of the art |
| 100a | block diagram showing the interactions between the system components of a conventional query-by-humming (QbH) music retrieval system 100', its input data 102 and output data 107 |

TABLE-continued

Depicted Features and Their Corresponding Reference Signs

| No. | Technical Feature (System Component or Procedure Step) |
|---|---|
| 100b | simplified block diagram of the aforementioned QbH music retrieval system 100', its input data 102 and output data 107 |
| 100c | more detailed system architecture of the QbH music retrieval system 100', its input data 102 and output data 107 |
| 101 | microphone |
| 102 | parts of a melody hummed serving as a query for a music information retrieval |
| 102' | MIDI files, stored in the MIDI database 103 |
| 102" | spoken text representing parts of a song's lyrics |
| 103 | MIDI database of the QbH music retrieval system 100', which contains a number of MIDI files 102' |
| 104' | 1$^{st}$ description unit of the matching engine 106 |
| 104" | automatic speech recognition (ASR) system |
| 104a | query processing (transcription) unit of the QbH music retrieval system 100' |
| 104b | MIDI processing unit of the QbH music retrieval system 100' |
| 105 | feature file database (WAV database) of the QbH music retrieval system 100' |
| 105' | 2$^{nd}$ description unit of the matching engine 106, |
| 105" | database comprising said reference vectors |
| 106 | matching engine of the QbH music retrieval system 100', used for calculating a similarity measure |
| 106' | similarity measure, indicating the similarity of a hummed melody 102 and a music file stored in the feature file database 105 |
| 106a | pitch tracking unit of the matching engine 106 |
| 106b | query engine of the matching engine 106 |
| 107 | rank list showing the ranked titles of melodies found by the QbH music retrieval system |
| 200a | simplified schematic view of a conventional QbH music retrieval system 100' according to the state of the art |
| 200b | more detailed schematic view of a conventional QbH music retrieval system 100' according to the state of the art |
| 300a | stave showing the musical notation of parts of the hummed melody 102, the time values of the notes, their pitch (semitone) numbers, the key, the intervals between the particular notes of the melody, their directions (U = „up", D = „down", S = „same"), and the number of equal-tempered semitones associated with the respective intervals |
| 300b | stave showing the musical notation, the intervals and interval directions of an ascending tonal second sequence, wherein the sequence motive is given by ascending thirds of a diatonic scale (here: the C major scale) |
| 300c | stave showing the musical notation, the intervals and interval directions of a descending tonal second sequence, said sequence being the retrograde mode (the horizontal inversion) of the ascending second sequence 300b |
| 400 | diagram showing the amplitude A versus time t of a speech signal for illustrating the change of voiced and unvoiced pronunciation according to the phonemes generated by a speaker's voice while articulating the words of a song's lyrics 102" |
| 500 | diagram showing the output of the pitch tracker function „get_f0" of the Entropic Signal Processing System (ESPS) |
| 600 | diagram showing the frequency variation $\Delta f$ (in Hz) versus time t (in ms) for a single hummed note at a sampling rate $f_s$ of 100 Hz |
| 700a | diagram showing an (N − 1) × (N − 1) alignment matrix D (here: N = 3), which illustrates a substitution operation with a cost factor $w(a_i, b_j) = 1$ |
| 700b | diagram showing the (N − 1) × (N − 1) alignment matrix D as described above, which illustrates a deletion operation with a cost factor $w(a_i, 0) = 1$ |
| 700c | diagram showing the (N − 1) × (N − 1) alignment matrix D as described above, which illustrates an insertion operation with a cost factor $w(0, b_j) = 1$ |
| 700d | diagram showing an example for a 2 × 2 alignment matrix D |
| 700e | diagram showing the 2 × 2 alignment matrix D |
| 700f | diagram showing the 2 × 2 alignment matrix D as described above with the components $d_{0,0} = 0$, $d_{1,0} = 1$, and $d_{0,1} = 1$, which illustrates a deletion operation with the cost factor $w(a_i, 0) = 1$ |
| 700g | diagram showing the 2 × 2 alignment matrix D as described above with the components $d_{0,0} = 0$, $d_{1,0} = 1$, and $d_{0,1} = 1$, that illustrates an insertion operation with the cost factor $w(0, b_j) = 1$ |
| 800a | diagram showing an example for a filled 8 × 8 alignment matrix D |
| 800b | diagram showing the filled 8 × 8 alignment matrix D as described above and the optimal way with the minimal total cost (sketched as a broken line), which is found by going backward from the (7,7)- to the (0,0)-element through said matrix according to the dynamic time warping (DTW) algorithm |
| 800c | table showing the intervals and/or interval directions $Dh_i$ and $Dr_j$ of the hummed reference melody REF and the found hypothesis melody HYPO, respectively, as well as the output sequences of the DTW alignment function-the tag elements (DTAGS) which denote matching intervals and/or interval directions (C) and intervals and/or interval directions which have to be deleted (D), inserted (I) or substituted (S) and the cost factors $w(a_i, b_j)$ |
| 900 | three-dimensional representation of N sung melodies 102, |
| 900 a + b | two parts of a flow chart illustrating a method for processing queries in the form of analog audio sequences 102, 300a or 400 |

TABLE-continued

Depicted Features and Their Corresponding Reference Signs

| No. | Technical Feature (System Component or Procedure Step) |
|---|---|
| 902 | repeated „da" model for pure humming of a melody, applied to the S-axis of the Cartesian coordinate system 900 |
| 1000 a – c' | five parts of a flow chart illustrating a detailed method for processing queries in the form of analog audio sequences 102, 300a or 400 by performing two Viterbi search algorithms on two two-dimensional search spaces |
| 1100 a – c | three parts of a further flow chart illustrating a detailed method for processing said queries by performing a single Viterbi search algorithm on a three-dimensional search space |
| S1 | step #1: recording analog audio sequences 102, 300a and/or 400 |
| S2a | step #2a: extracting musical key characteristics |
| S2b | step #2b: analyzing these musical key characteristics |
| S2c | step #2c: recognizing these musical key characteristics by performing a Viterbi search algorithm on a two-dimensional search space having a time dimension and one dimension for an appropriate coding of the musical key characteristics |
| S3a | step #3a: calculating a similarity measure indicating the similarity of the melody of the recorded audio sequence 102 or 300a and the melodies of various music files stored in said databases 103 and/or 105 |
| S3a' | step #3a': calculating a similarity measure indicating the similarity of the spoken text and the lyrics of various music files stored in said database 103 or 105 |
| S3b | step #3b: generating a ranked list 107 of the music files stored in said database |
| S4a | step #4a: extracting various acoustic-phonetic speech characteristics of the speaker's voice and pronunciation from spoken parts 400 of a recorded song's lyrics 102" |
| S4b | step #4b: analyzing these acoustic-phonetic speech characteristics |
| S4c | step #4c: recognizing syntax and semantics of said lyrics 102" by performing a Viterbi search algorithm on a two-dimensional search space having a time dimension and one dimension for an appropriate coding of the acoustic-phonetic speech characteristics |
| S5a | step #5a: encoding recognized intervals and/or interval directions of a sung or hummed tune 102 and/or a played melody 300a |
| S5a' | step #5a': encoding recognized phonemes from spoken parts 400 of a recorded song's lyrics 102" consisting of P phonemes, wherein P is an integer value greater than one, by a first character string, in the following referred to as "speech reference string" $REF_s$ |
| S5b | step #5b: retrieving encoded intervals and/or interval directions of previously analyzed melodies |
| S5b' | step #5b': retrieving phonemes of previously analyzed speech signals |
| S5c | step #5c: calculating a similarity measure which indicates the similarity between the melody of the recorded audio sequence 102 and the melodies of various music files stored in said database 103 or 105 by using an $(N - 1) \times (N - 1)$ alignment matrix D having the character index i of the k-th melody hypothesis string $a := (Interval_1, \ldots, Interval_{N-1})^T$ as column coordinate and the character index j of the melody reference string $b := (Interval_1, \ldots, Interval_{N-1})^T$ as row coordinate |
| S5c' | step #5c': calculating a similarity measure which indicates the similarity between the speech signal of the recorded audio sequence 102 and a variety of speech signals stored |
| S5d | step #5d: generating a ranked list 107 of the files stored in the database 103 and/or 105, sorted from the one with the greatest similarity value to the one with the lowest similarity value |
| S5d' | step #5d': generating a ranked list 107 of the files stored in the database, sorted from the one with the greatest similarity value to the one with the lowest similarity value |
| S6a | step #6a: creating an $(N - 1) \times (N - 1)$ alignment matrix D |
| S6a' | step #6a': creating a $P \times P$ alignment matrix $D_s$ |
| S6b | step #6b: executing an alignment function based on the Viterbi search algorithm |
| S6b' | step #6b': executing an alignment function based on the Viterbi search algorithm |
| S6c | step #6c: executing a backtracking algorithm |
| S6c' | step #6c': executing a backtracking algorithm |
| S7 | step #7: calculating the elements $d_{i,j}$ of said alignment matrix D ($D_s$, $D_{ms}$) |
| S8a | step #8a: extracting acoustic-phonetic speech characteristics of a speaker's voice and pronunciation from a sung or hummed tune 102 and/or a played melody 300a |
| S8b | step #8b: analyzing these acoustic-phonetic speech characteristics |
| S8c | step #8c: recognizing these acoustic-phonetic speech characteristics by performing a Viterbi search algorithm on a three-dimensional trellis search |
| S9a | step #9a: encoding recognized phonemes from spoken parts 400 of a recorded song's lyrics 102" |
| S9b | step #9b: retrieving phonemes of previously analyzed speech signals consisting of P phonemes, |
| S9c | step #9c: calculating a similarity measure |
| S9d | step #9d: generating a ranked list 107 of the files stored in the database, sorted from the one with the greatest similarity value to the one with the lowest similarity value |
| S10a | step #10a: creating an $(N + P - 1) \times (N + P - 1)$ alignment matrix $D_{ms}$ |
| S10b | step #10b: Executing an alignment function based on the Viterbi search algorithm |
| S10c | step #10c: Executing a backtracking algorithm |
| S11a | step #11a: prestoring a defined set of music sequences with associated information |

TABLE-continued

Depicted Features and Their Corresponding Reference Signs

| No. | Technical Feature (System Component or Procedure Step) |
|---|---|
| S11b | step #11b: entering speech information 400 and/or music information 102 or 300a |
| S11c | step #11c: arranging a coding representing said speech and music information respectively as a first (S) and a second dimension (H) of a three-dimensional search space, time (t) being the third dimension |
| S11d | step #11d: carrying out a search in the three-dimensional search space in order to find the music sequence out of the set of music sequences matching best to the entered speech information 400 and/or music information 102 or 300a |
| S12 | step #12: individually pre-processing the entered speech information 400 and/or music information 102 or 300a before respectively being represented as a coding in the three-dimensional search space |
| S13a | step #13a: carrying out a partial search respectively for the speech information 400 and the music information 102 or 300a by individually matching the entered and coded speech and/or music information with the music sequences prestored, thus achieving for each prestored music sequence one partial score for the music information and one partial score for the speech information |
| S13b | step #13b: combining the two partial scores to generate an overall score for each prestored music sequence |

The invention claimed is:

1. A method for the retrieval of music information based on audio input comprising:
pre-storing a defined set of music sequences with associated information;
entering at least one of speech and music information and arranging a coding representing said speech and music information, respectively, as a first (S) and a second dimension (H) of a three-dimensional search space, time (t) being the third dimension, and
carrying out a search in the three-dimensional search space in order to find the music sequence out of the set of music sequences matching best to the entered at least one of speech and music information, and
retrieving said music sequence for a user that has placed an inquiry for said information.

2. The method of claim 1, wherein the at least one of entered speech and music information is individually pre-processed before respectively being represented as a coding in the three-dimensional search space.

3. The method of any one of claims 1 or 2, further comprising:
calculating a similarity measure indicating the similarity of the entered speech and music information compared to melody and lyrics of the pre-stored music files in a database, and
generating a ranked list of said music files, the ranking of a music file depending on the similarity measure.

4. The method of claim 3, further comprising:
encoding at least one of a sung or hummed tune and a played melody consisting at least of N notes and pauses, wherein N is an integer value greater than one, by a melody reference string (REF),
retrieving encoded previously analyzed melodies consisting at least of N notes and pauses whose scores are stored in a database and encoded by a melody hypothesis strings ($HYPO_0$, $HYPO_1$, ..., $HYPO_k$, ..., $HYPO_{M-1}$),
encoding recognized phonemes from spoken parts of a recorded song's lyrics consisting of P phonemes, wherein P is an integer value greater than one, by speech reference string ($REF_s$), and concatenating said speech reference string ($REF_s$) to said melody reference string (REF), thus yielding a combined reference string ($REF_{ms}$), retrieving phonemes of previously analyzed speech signals consisting of P phonemes, said phonemes being encoded by a second character string, from a number (Q) of pre-stored character strings, in the following referred to as speech hypothesis strings ($HYPO_{s0}$, $HYPO_{s1}$, $HYPO_{s2}$, ..., $HYPO_{s,k}$, ..., $HYPO_{s,Q-1}$), and concatenating said speech hypothesis strings to said melody hypothesis strings, thus yielding combined hypothesis strings ($HYPO_{ms0}$, $HYPO_{ms1}$, $HYPO_{ms2}$, ..., $HYPO_{ms,k}$, ..., $HYPO_{ms,M+Q-1}$), and
calculating a similarity measure indicating the similarity between the melody and lyrics of the recorded audio sequence compared to melody and lyrics of a variety of music files stored in said database by using a single two-dimensional search space in form of an (N+P−1)×(N+P−1) alignment matrix ($D_{ms}$) having the character index i of the k-th combined hypothesis string ($a_{ms}:=$ ($Interval_1$, ..., $Interval_{N-1}$, $Phoneme_1$, ..., $Phoneme_P$)$^T$) as column coordinate and the character index j of the combined reference string ($b_{ms}:=$($Interval_1$, ..., $Interval_{N-1}$, $Phoneme_1$, ..., $Phoneme_P$)$^T$) as row coordinate.

5. The method of claim 4, wherein the step of calculating said similarity measure comprises:
creating an (N+P−1)×(N+P−1) alignment matrix ($D_{ms}$) by setting the character index i of the k-th hypothesis string ($a_{ms}:=$($Interval_1$, ..., $Interval_{N-1}$, $Phoneme_1$, ..., $Phoneme_P$)$^T$) as coordinate for the columns and the character index j of the reference string ($b_{ms}:=$($Interval_1$, ..., $Interval_{N-1}$, $Phoneme_1$, ..., $Phoneme_P$)$^T$) as coordinate for the rows of said matrix and filling the alignment matrix ($D_{ms}$) by calculating and setting each (i,j)-element of said matrix according to a filling scheme for filling accumulated cost factors ($d_{i,j}=f(d_{i-1,j}, d_{i,j-1}, d_{i-1,j-1}, w(a_i, b_j))$) into the cells of said alignment matrix ($D_{ms}$),
executing an alignment function based on the Viterbi search algorithm to compare the combined reference string ($REF_{ms}$) with the combined hypothesis strings ($HYPO_{ms0}$, $HYPO_{ms1}$, $HYPO_{ms2}$, ..., $HYPO_{ms,k}$, ..., $HYPO_{ms,M+Q-1}$) of all stored melodies and lyrics, thereby returning at least one of a string of characters and a sequence of cost factors ($w(a_i, b_j)$) indicating which characters of the combined reference string ($REF_{ms}$) closely match with the characters of the k-th combined hypothesis string ($HYPO_{ms,k}$), and executing a backtracking algorithm which starts with the lowest cost factor in the last column of the alignment matrix ($D_{ms}$) and goes back through the alignment matrix towards the first row and the first column of said matrix along a tracking path derived by the alignment function.

6. The method of claim 5, wherein the elements ($d_{i,j}$) of said alignment matrix ($D_{ms}$) are characterized according to the following filling scheme:

$$d_{ij} := \min \begin{cases} d_{i-1,j} + w(a_i, 0) & \forall\, i,j \in \{1, 2, \ldots, N+P-1\} \\ d_{i-1,j-1} + w(a_i, b_j) & \forall\, i,j \in \{1, 2, \ldots, N+P-1\} \\ d_{i,j-1} + w(0, b_j) & \forall\, i,j \in \{1, 2, \ldots, N+P-1\} \end{cases}$$

wherein the initial conditions are $d_{0,0} := 0$, $d_{i,0} := d_{i-1,0} + w(a_i, 0)\ \forall\, i \in \{1, 2, 3, \ldots, N+P-1\}$, and $d_{0,j} := d_{0,j-1} + w(0, b_j)\ \forall\, j \in \{1, 2, 3, \ldots, N+P-1\}$, and wherein $w(a_i, 0)$ is a cost factor associated with the deletion of the character $a_i$ of the k-th hypothesis string ($HYPO_{ms,k}$), $w(0, b_j)$ is a cost factor associated with the insertion of the character $b_j$ into the combined reference string ($REF_{ms}$), and $w(a_i, b_j)$ is a cost factor associated with the replacement of the element $a_i$ of the k-th combined hypothesis string ($HYPO_{ms,k}$) by the element $b_j$ of the combined reference string ($REF_{ms}$), wherein $w(a_i, b_j)$ is set to zero if $a_i = b_j$ and set to a value greater than zero if $a_i \neq b_j$.

7. A computer-readable recording medium including a computer software program which, when executed by a computing device, causes the computing device to implement the method of claim 1.

8. A music information retrieval system based on audio input, comprising:
a database for prestoring a defined set of music sequences with associated information;
means for entering at least one of speech and music information;
coding means for arranging a coding representing said speech and music information respectively as a first (S) and a second dimension (H) of a three-dimensional search space, time (t) being the third dimension; and
matching means for carrying out a search in the three-dimensional search space in order to find the music sequence out of the set of music sequences matching best to the entered speech and/or music information.

9. The music information retrieval system of claim 8, wherein said coding means comprises:
an automatic music recognition system for extracting, analyzing and recognizing musical key characteristics from analog audio sequences; and
an automatic speech recognition system for extracting and analyzing acoustic-phonetic speech characteristics of the speaker's voice and pronunciation from spoken parts of the recorded song's lyrics and for recognizing syntax and semantics of said lyrics.

10. The music information retrieval system of claims 8 or 9, wherein said matching means comprises:
means for calculating a similarity measure indicating the similarity of melody and lyrics of the entered audio sequence compared to melody and lyrics of various music files stored in said database by performing a Viterbi search algorithm on the three-dimensional search space and for generating a ranked list of said music files.

* * * * *